United States Patent
Hsieh et al.

(10) Patent No.: US 11,662,526 B1
(45) Date of Patent: May 30, 2023

(54) OPTICAL STRUCTURE

(71) Applicant: VisEra Technologies Company Ltd., Hsin-Chu (TW)

(72) Inventors: Hsin-Yi Hsieh, Taoyuan (TW); Chin-Chuan Hsieh, Hsin-Chu (TW)

(73) Assignee: VisEra Technologies Company Ltd., Hsin-Chu (TW)

( * ) Notice: Subject to any disclaimer, the term of this patent is extended or adjusted under 35 U.S.C. 154(b) by 48 days.

(21) Appl. No.: 17/547,025

(22) Filed: Dec. 9, 2021

(51) Int. Cl.
*G02B 6/34* (2006.01)
*G02B 6/124* (2006.01)
*G02B 6/42* (2006.01)

(52) U.S. Cl.
CPC .............. *G02B 6/34* (2013.01); *G02B 6/124* (2013.01); *G02B 6/4204* (2013.01); *G02B 6/4214* (2013.01)

(58) Field of Classification Search
CPC ........ G02B 6/34; G02B 6/124; G02B 6/4204; G02B 6/4214
See application file for complete search history.

(56) References Cited

U.S. PATENT DOCUMENTS

| | | |
|---|---|---|
| 5,276,745 A | 1/1994 | Revelli, Jr. |
| 5,450,237 A * | 9/1995 | Yoshida ............... G11B 7/1374 |
| 9,846,126 B2 | 12/2017 | Gunn, III et al. |
| 2009/0323204 A1 | 12/2009 | Huang |
| 2010/0055666 A1 | 3/2010 | Wimberger-Friedl et al. |
| 2011/0299104 A1* | 12/2011 | Seo ........................ G01J 3/513 |
| | | 358/1.9 |
| 2013/0250404 A1 | 9/2013 | Yang et al. |
| 2016/0273034 A1 | 9/2016 | Lundquist et al. |
| 2017/0059446 A1 | 3/2017 | Maeda |

FOREIGN PATENT DOCUMENTS

| | | |
|---|---|---|
| CN | 201209466 A | 3/2012 |
| CN | 107615121 A | 1/2018 |
| CN | 111649840 A | 9/2020 |
| CN | 112630901 A | 4/2021 |

* cited by examiner

*Primary Examiner* — Michael P Mooney
(74) *Attorney, Agent, or Firm* — Liu & Liu

(57) ABSTRACT

An optical structure includes a grating coupler and a microlens. The grating coupler is configured to receive a laser light. The microlens is above the grating coupler, in which a metal shielding covers the microlens and has an opening to allow the laser light entering an effective coupling region of the grating coupler.

20 Claims, 23 Drawing Sheets

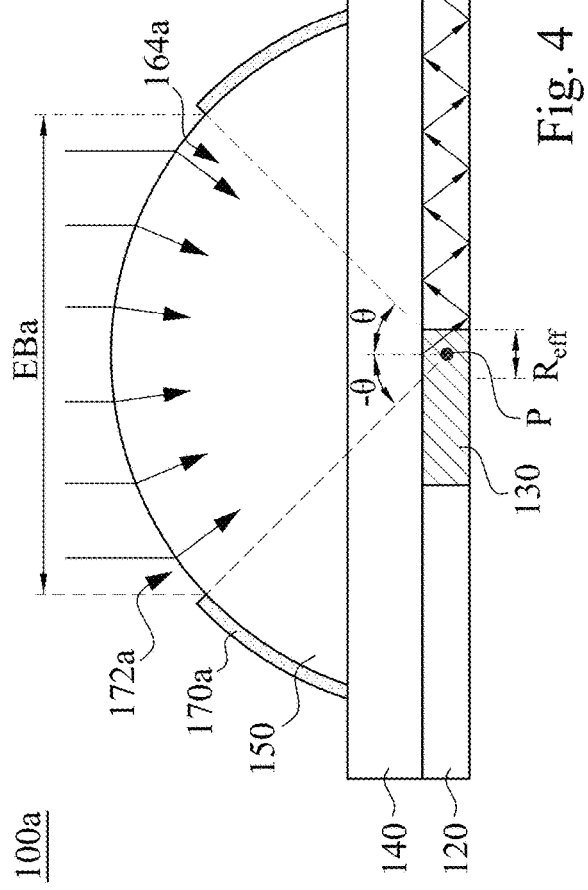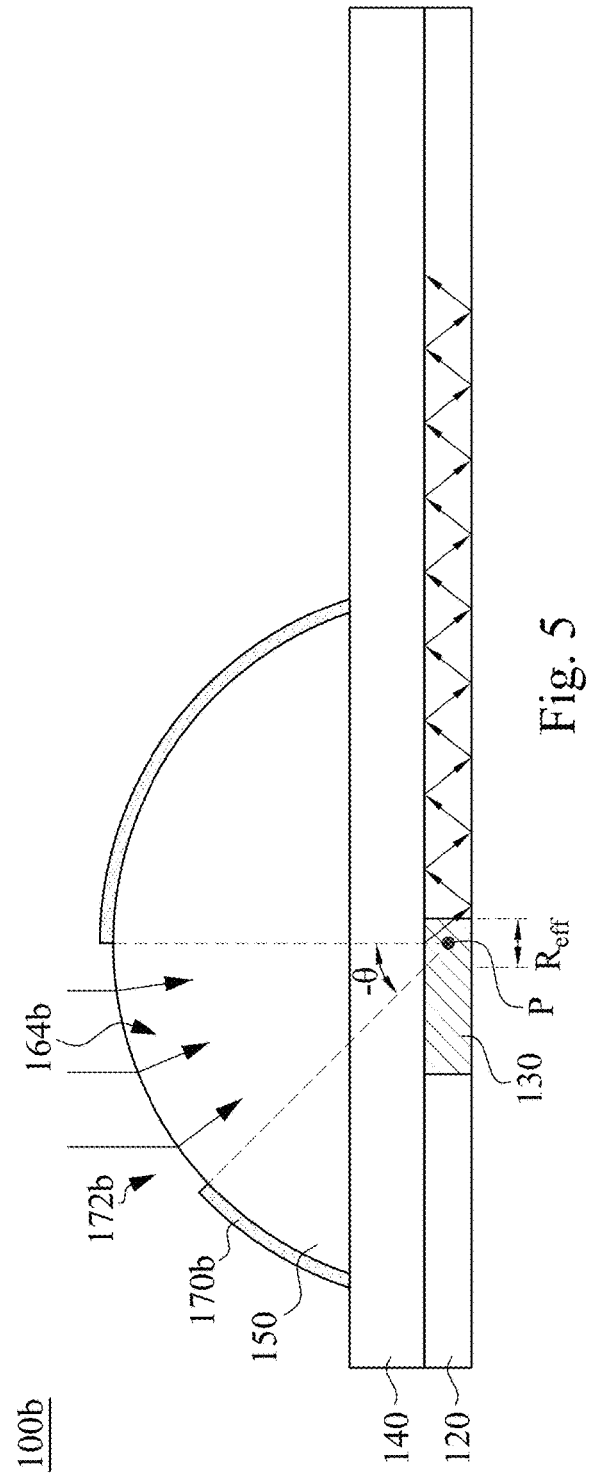

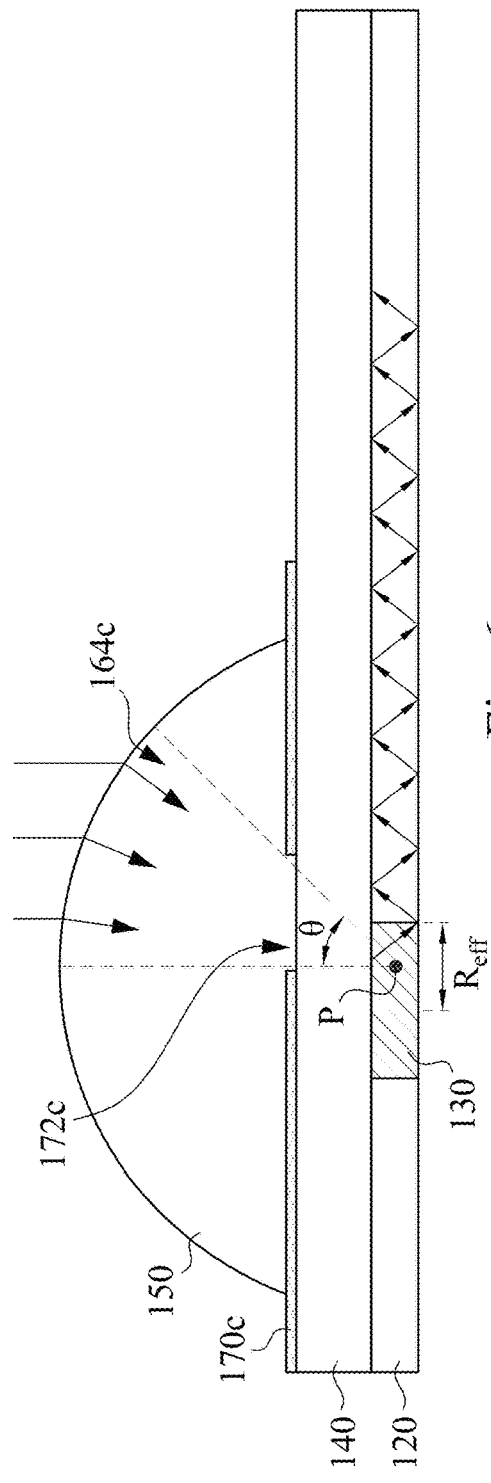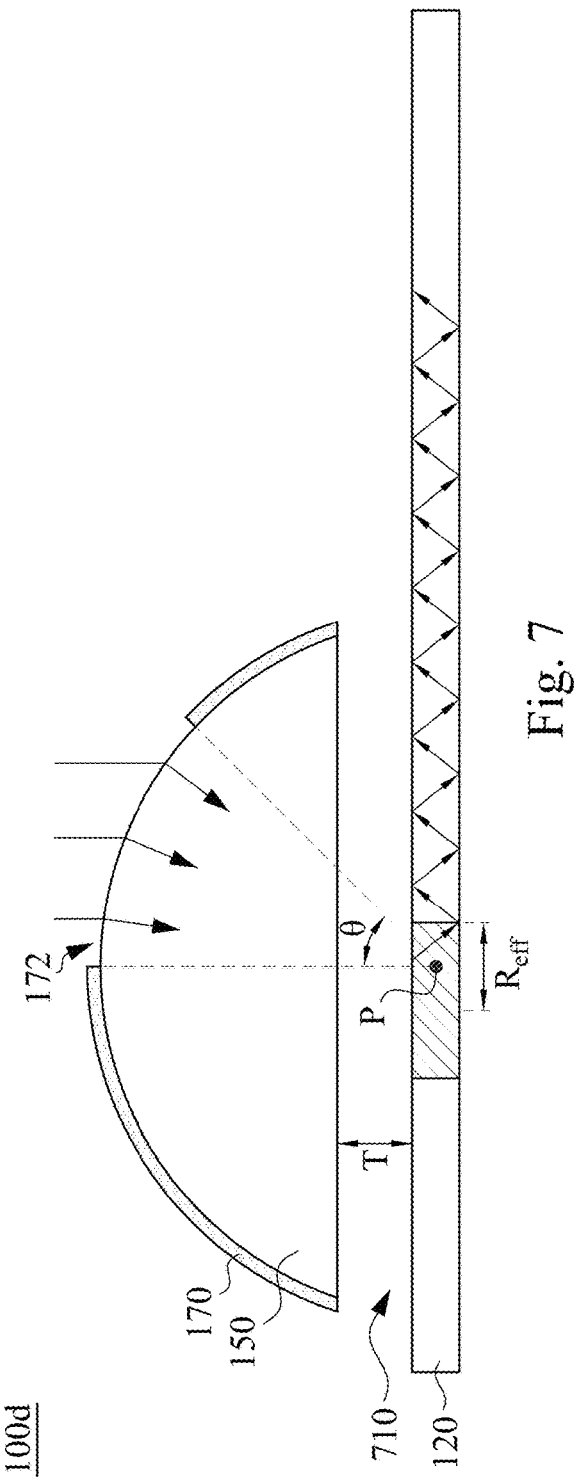

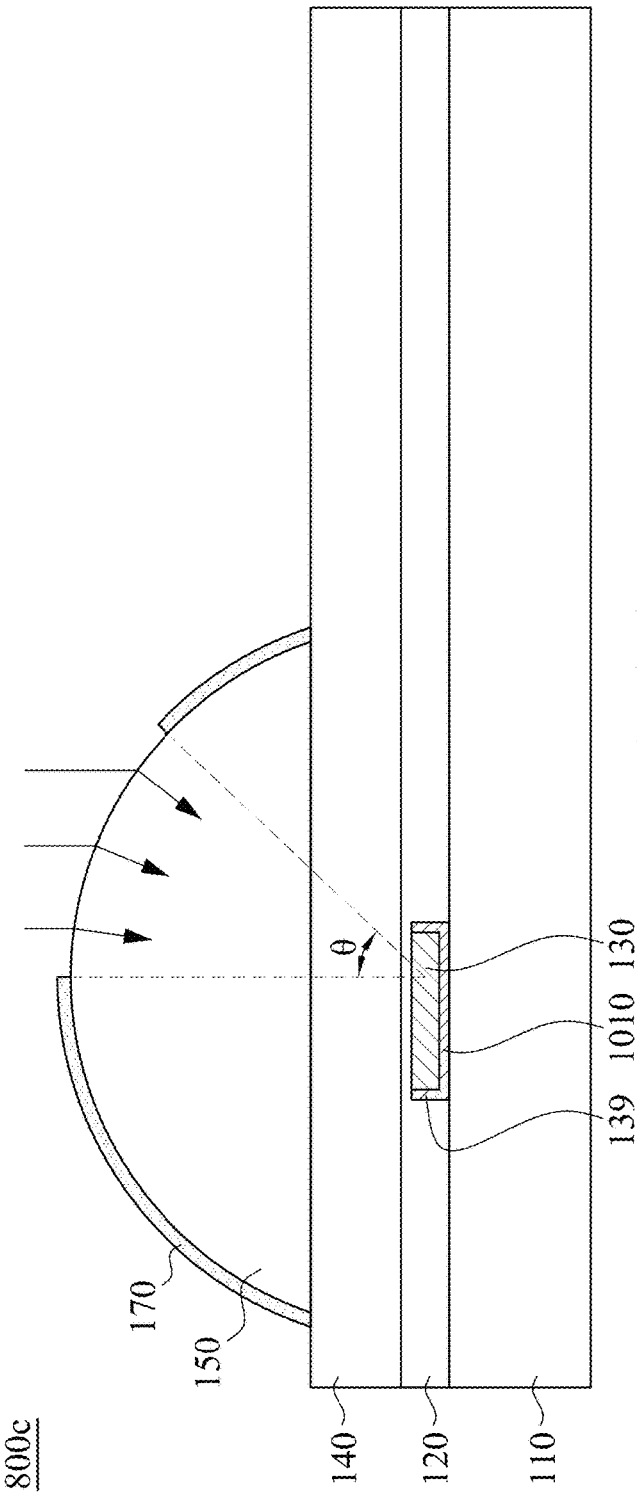
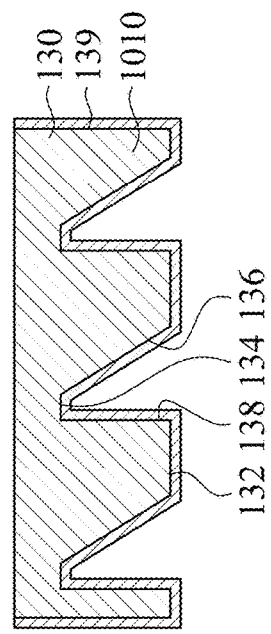
Fig. 11A
Fig. 11B

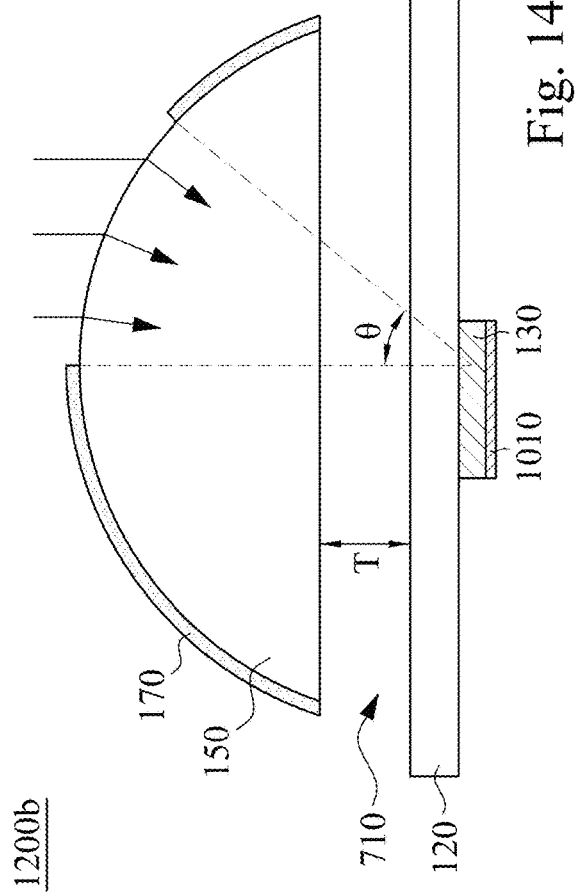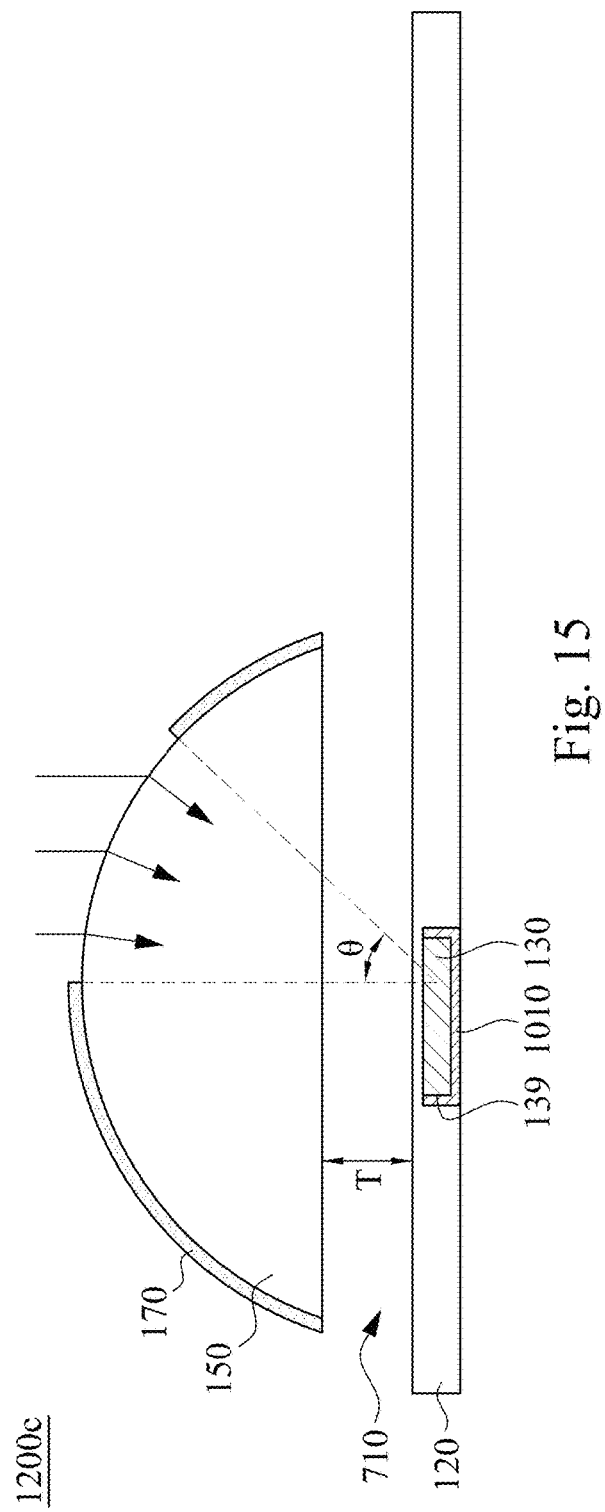

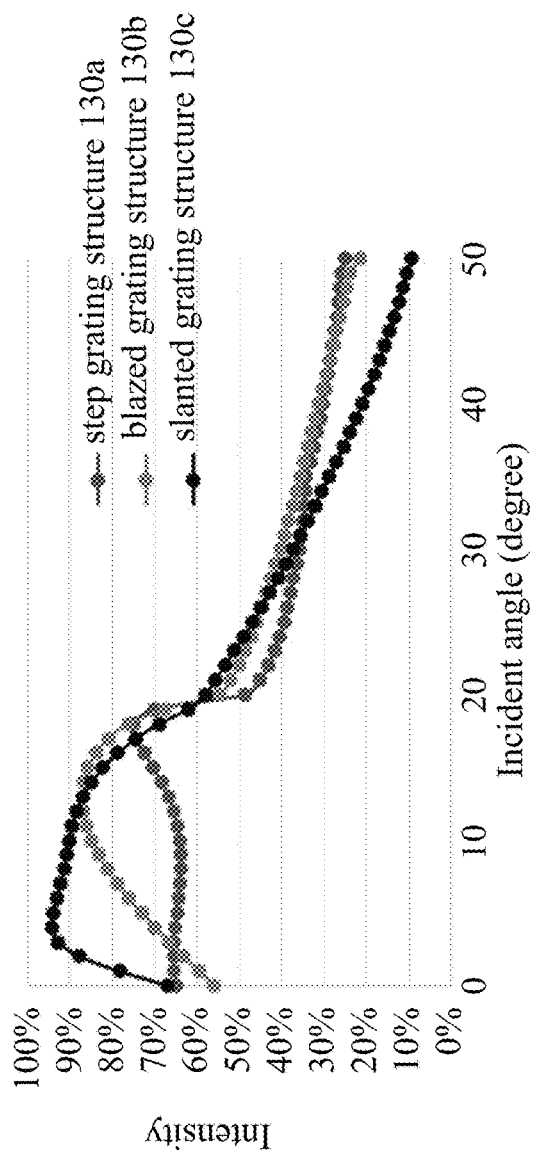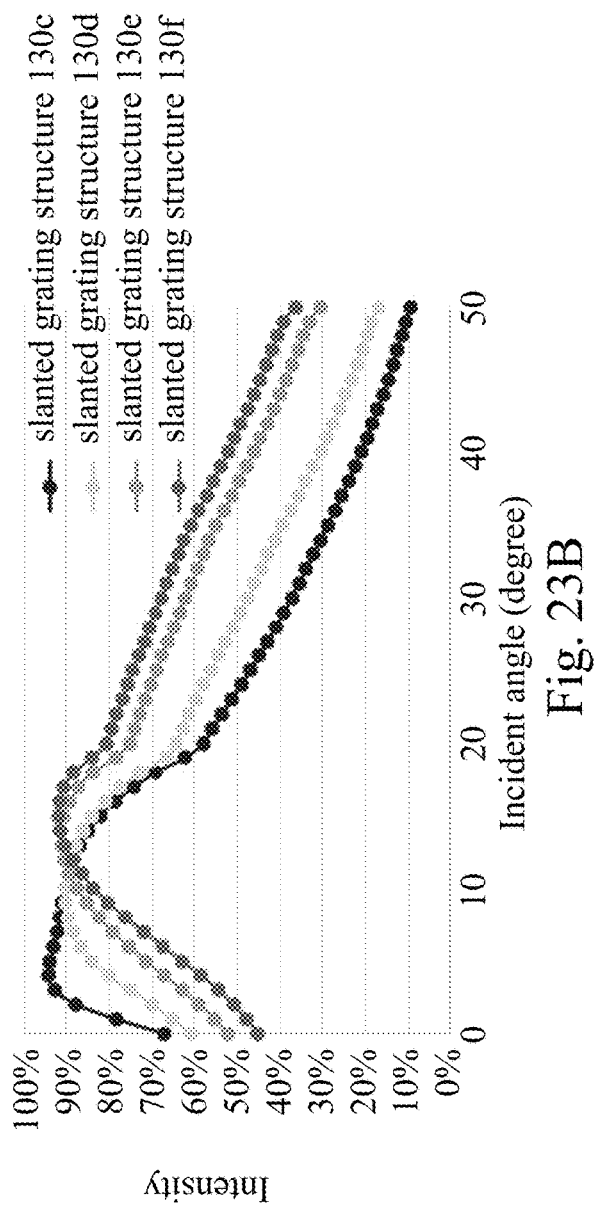

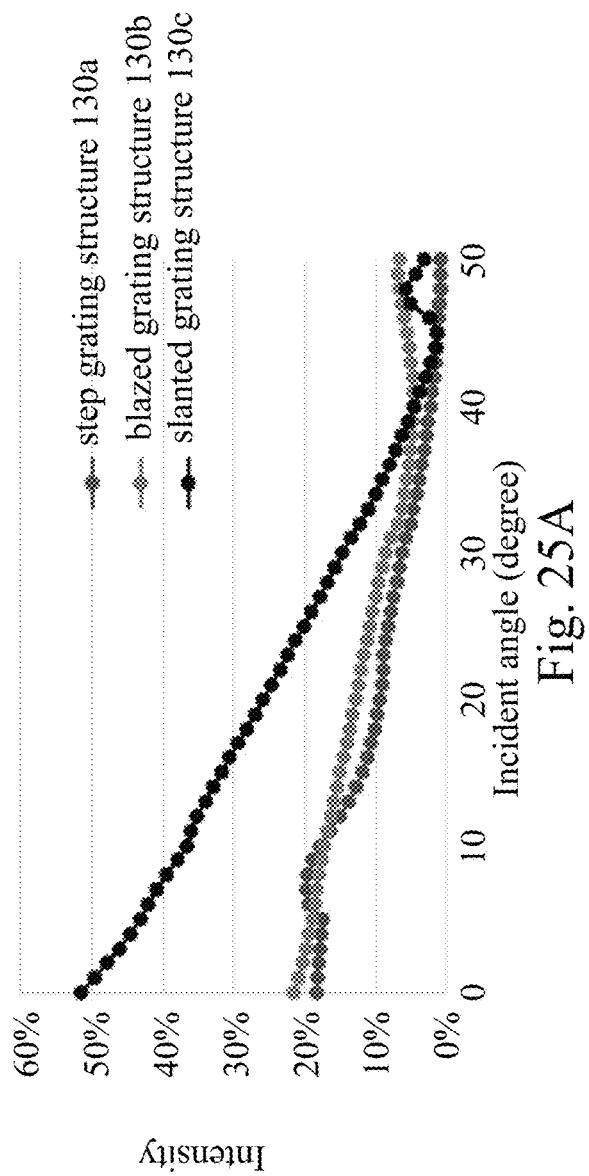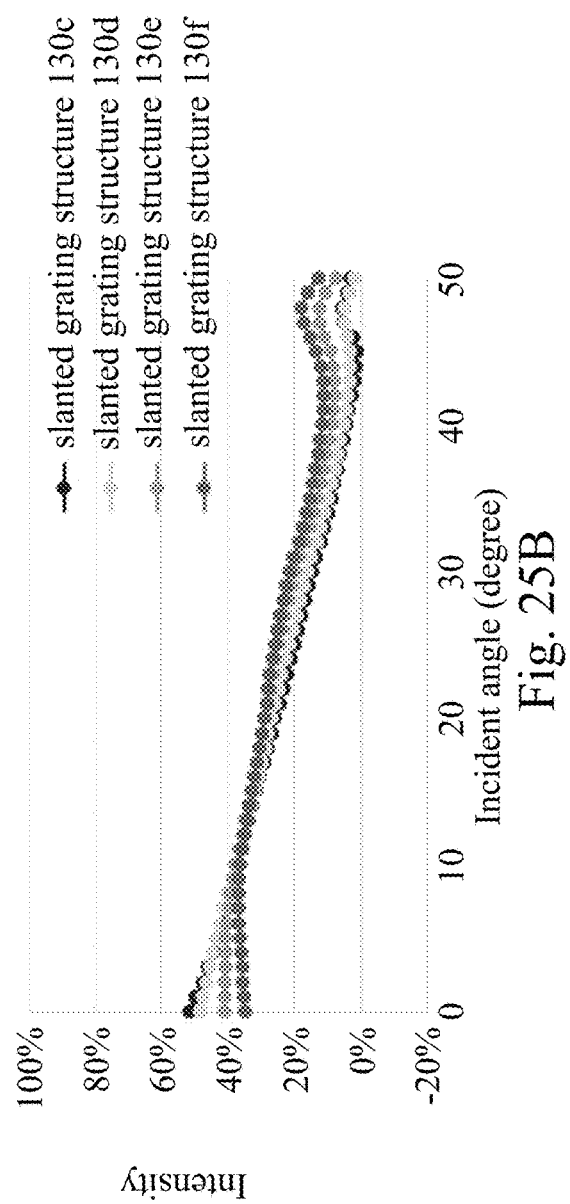
Fig. 25A
Fig. 25B

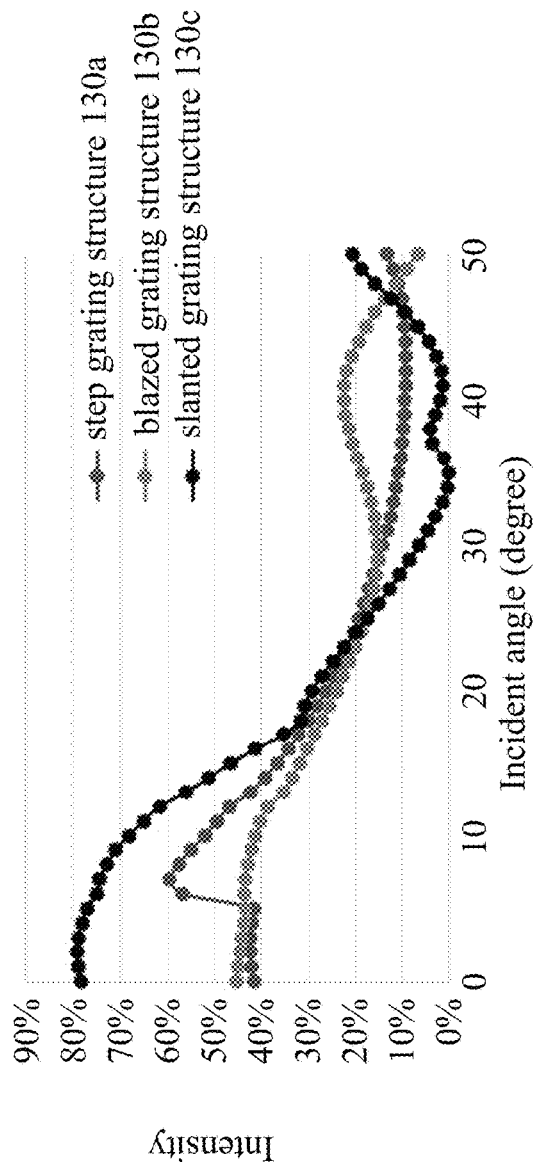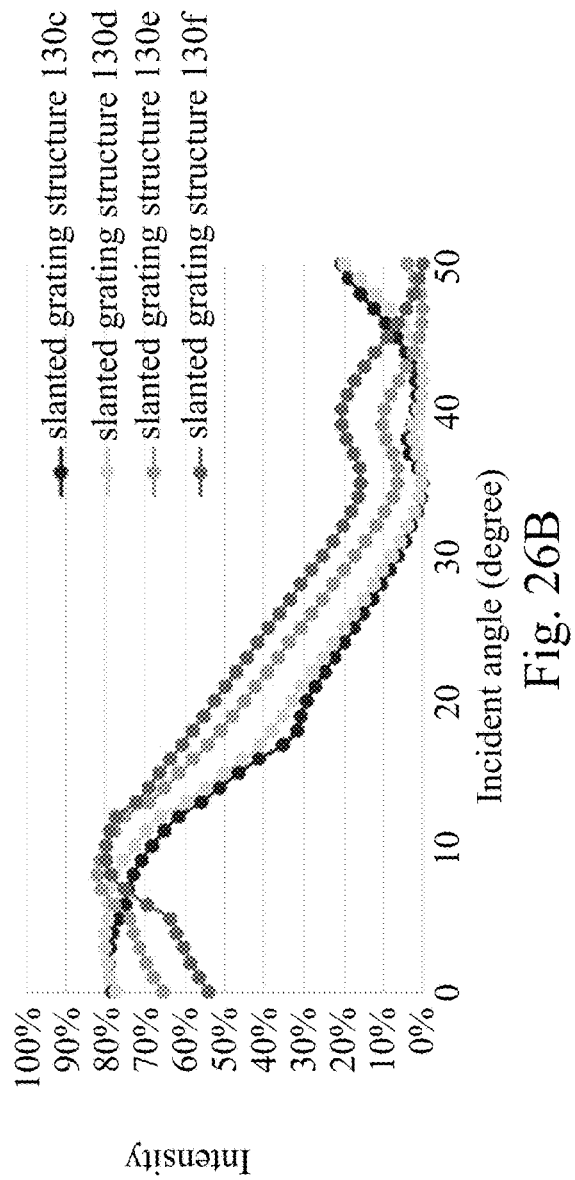

OPTICAL STRUCTURE

BACKGROUND

Field of Invention

The present disclosure relates to an optical structure. More particularly, the optical structure can be applied in biosensors.

Description of Related Art

Grating waveguides have been widely applied in biosensors, augmented reality (AR), virtual reality (VR), telecommunication, and so on. In the field of biosensors, a grating coupling efficiency would affect the luminous efficiencies of fluorescence-labeled biomolecules, and several factors would impact the grating coupling efficiency. For example, an alignment between an external light and a grating structure, material properties of optical elements in the grating waveguide structure, and geometric structures of grating couplers.

Light propagating in a waveguide layer, which is used for uniform and localized excitation on the fluorescence-labeled biomolecules within the evanescence wave region on the waveguide core, could be generated by coupling the external light entering into the optical structure via a grating nanostructure. However, the coupling efficiency from a laser beam into the grating waveguide is relatively low, which would cause a low luminous efficiency of the fluorescent tags, due to the tight alignment request (including xyz-axis offsets and incident angle) and relatively small effective coupling width of the grating coupler compared to the diameter of a laser beam. Therefore, there is a need to solve the grating coupling efficiency of the grating waveguides to improve the luminous efficiency of fluorescence-labeled biomolecules in biosensor application.

SUMMARY

One aspect of the present disclosure is to provide an optical structure. The optical structure includes a grating coupler and a microlens. The grating coupler is configured to receive a laser light. The microlens is above the grating coupler, in which a metal shielding covers the microlens and has an opening to allow the laser light entering an effective coupling region of the grating coupler.

According to some embodiments of the present disclosure, the opening of the metal shielding is configured to make a portion of the laser light enter the microlens, and the opening has an angle in a range from −50 degrees to 50 degrees.

According to some embodiments of the present disclosure, the laser light has offset angles due to the misalignment of an optical system, and an irradiation area of the laser light is greater than the effective coupling region of the grating coupler.

According to some embodiments of the present disclosure, the offset angles are in a range from −20 degrees to 20 degrees.

According to some embodiments of the present disclosure, the metal shielding is disposed between the microlens and the grating coupler.

According to some embodiments of the present disclosure, the optical structure further includes a core layer, a substrate, and an upper cladding layer. The core layer is adjacent to the grating coupler. The substrate is covered by the core layer. The upper cladding layer covers the core layer.

According to some embodiments of the present disclosure, the substrate comprises sapphire or glass, and has a refractive index in a range from 1.45 to 2.0.

According to some embodiments of the present disclosure, the substrate comprises silicon or CMOS.

According to some embodiments of the present disclosure, the optical structure further includes a bottom cladding layer between the substrate and the core layer, in which the bottom cladding layer has a refractive index less than 1.6 and a dielectric constant less than 0.00001 at visible light wavelength.

According to some embodiments of the present disclosure, the upper cladding layer includes silicon oxide or polymer, and a refractive index of the core layer is greater than a refractive index of the upper cladding layer.

According to some embodiments of the present disclosure, the refractive index of the upper cladding layer is less than 1.6 and a dielectric constant less than 0.00001 at visible light wavelength.

According to some embodiments of the present disclosure, the grating coupler is embedded in the core layer.

According to some embodiments of the present disclosure, the grating coupler includes a straight shape when viewed from above, a cross-sectional shape of the microlens is half-cylindrical, and the core layer includes a planar waveguide.

According to some embodiments of the present disclosure, the grating coupler includes a curved shape when viewed from above, and the core layer includes a plurality of channel waveguides.

According to some embodiments of the present disclosure, the grating coupler has a surface facing toward the substrate and a sidewall adjoining the surface, and the optical structure further includes a metal reflector disposed on the surface and the sidewall of the grating coupler.

According to some embodiments of the present disclosure, the grating coupler is disposed on a surface of the core layer facing toward the microlens, and the core layer has a portion between the grating coupler and the substrate, in which a material of the grating coupler is different from a material of the core layer.

According to some embodiments of the present disclosure, the grating coupler has a tapered thickness.

According to some embodiments of the present disclosure, the grating coupler is disposed on a surface of the core layer facing toward the substrate, and the core layer has a portion between the microlens and the grating coupler.

According to some embodiments of the present disclosure, the optical structure further includes a metal reflector disposed on a surface of the grating coupler facing toward the substrate.

According to some embodiments of the present disclosure, the grating coupler is a step grating structure, a blazed grating structure, or a slanted grating structure.

According to some embodiments of the present disclosure, the step grating structure includes a first vertical sidewall, a second vertical sidewall, and a horizontal surface adjoining the first vertical sidewall and the second vertical sidewall.

According to some embodiments of the present disclosure, the blazed grating structure includes an oblique sidewall extending from a top of the blazed grating structure to a bottom of the blazed grating structure, and a width of the blazed grating structure gradually increases from the top of the blazed grating structure to the bottom of the blazed grating structure.

According to some embodiments of the present disclosure, the slanted grating structure includes a first oblique sidewall, a second oblique sidewall, and a top surface adjoining the first oblique sidewall and the second oblique sidewall.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4, FIG. 5, FIG. 6, and FIG. 7 are cross-sectional views of optical structures in accordance with alternative embodiments of the present disclosure.

FIG. 8, FIG. 9A, FIG. 10A, and FIG. 11A are cross-sectional views of optical structures in accordance with alternative embodiments of the present disclosure.

FIG. 9B, FIG. 10B, and FIG. 11B are enlargement views of the grating couplers in FIG. 9A, FIG. 10A, and FIG. 11A, respectively.

FIG. 12, FIG. 13, FIG. 14, and FIG. 15 are cross-sectional views of optical structures in accordance with alternative embodiments of the present disclosure.

FIG. 23A, FIG. 23B, FIG. 24A, FIG. 24B, FIG. 25A, FIG. 25B, FIG. 26A, and FIG. 26B are incident angle-intensity charts for a green light having 532 nm wavelength under different grating structures in accordance with some embodiments of the present disclosure.

DETAILED DESCRIPTION

Figure 1A:
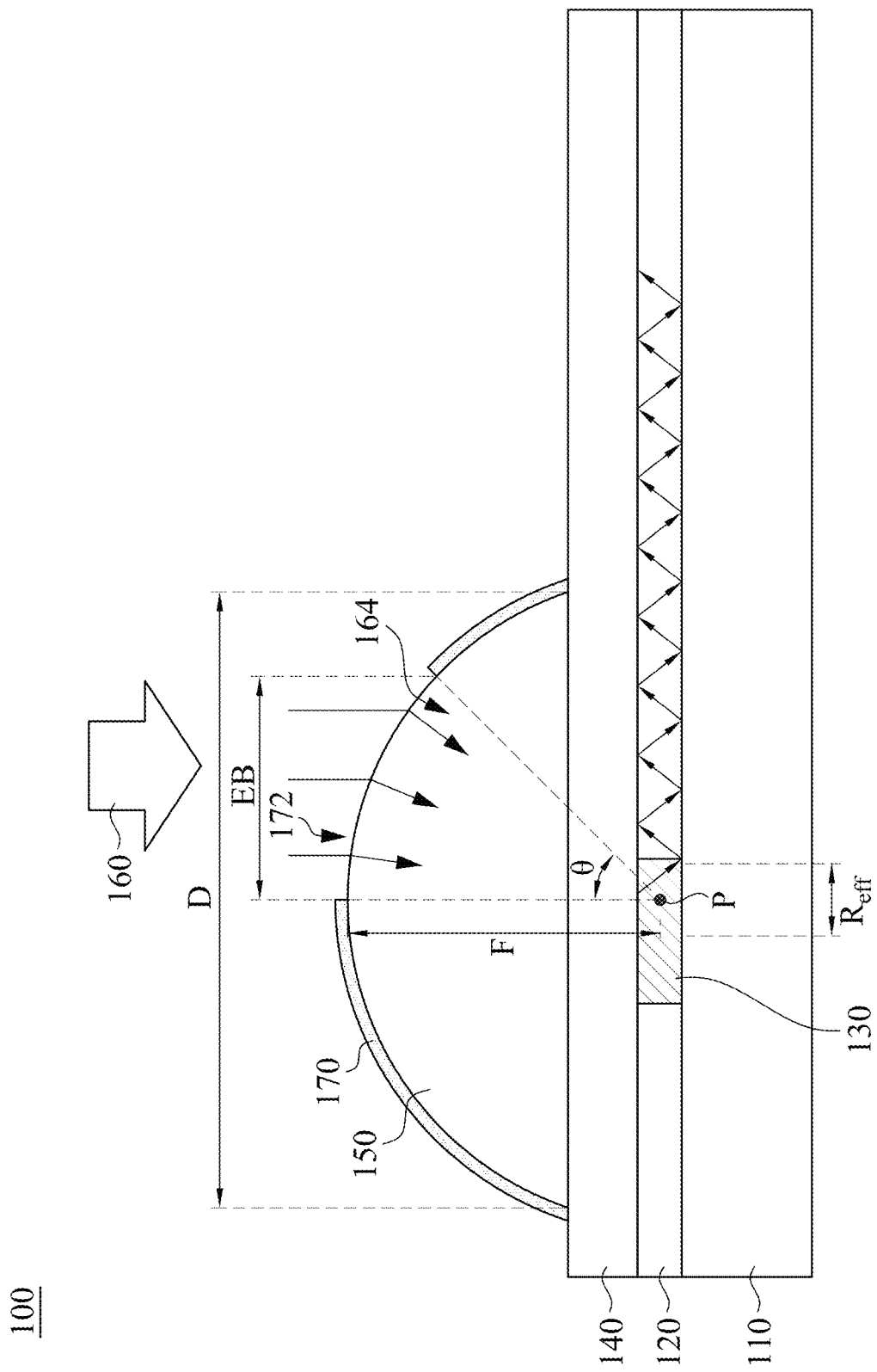
FIG. 1A, FIG. 2, and FIG. 3 are cross-sectional views of optical structures in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. It should be understood that the number of any elements/components is merely for illustration, and it does not intend to limit the present disclosure.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the field of biosensors, the luminous efficiencies of fluorescence-labeled biomolecules would be affected by a grating coupling efficiency. When an external light including a single or multiple wavelengths enters into an optical structure through a binary (2-step) grating coupler (GC), only the light energy exposure on the effective coupling area (about 10-20 μm near the inner edge of the grating coupler) at precise incident angle (about +/−1 degree) could be coupled into the waveguide. Thus, the grating coupling efficiency of the optical structure is usually low. The grating coupling efficiency can be caused by, for example, an alignment between the external light and the grating structure, the beam diameter of a laser light, the material properties of optical elements in the grating waveguide structure, geometric structures of grating couplers, and so on.

The optical structure of the present disclosure combines a microlens structure for the conversion of a large and collimating laser beam to a condensed focusing light that is exposed on the effective coupling area. The present disclosure provides a variety of grating structures, such as n-step (n>=3), blazed, or slanted grating, having the features of greater coupling angle tolerance and high grating coupling efficiencies which allows for the possibilities of coupling a single or multiple wavelengths into one grating waveguide for the excitation of fluorescence-labeled biomolecules. Specifically, it may cause less variety of fluorophores that could be excited and emit fluorescence signals when only single wavelength couples into one grating waveguide. By contrast, it may cause more variety of fluorophores that could be excited and emit fluorescence signals when multiple wavelengths couple into one grating waveguide. However, the present disclosure does not limit to coupling single or multiple wavelengths. The present disclosure can also provide a large alignment tolerance in the optical structure including xyz-axis and the angle of incidence, thereby increasing the overall coupling efficiency of the optical structure for bio-detections.

FIG. 1A is a cross-sectional view of an optical structure 100 in accordance with some embodiments of the present disclosure. The optical structure 100 includes a substrate 110, a core layer 120, and a grating coupler 130. The substrate 110 is covered by the core layer 120. In some embodiments, the substrate 110 is transparent and includes sapphire or glass. When the substrate 110 is transparent, the substrate 110 has a refractive index in a range from 1.45 to 1.7, such as 1.5 or 1.6. The core layer 120 covers the substrate 110. In some embodiments, a refractive index of the core layer 120 is relatively higher than the refractive index of the substrate 110. In some embodiments, the core layer 120 includes $Nb_2O_5$, $Ta_2O_5$, $TiO_2$, $Si_3N_4$, or other suitable materials. The grating coupler 130 is adjacent to the core layer 120 and is configured to receive a laser light 160. For example, the grating coupler 130 is embedded in the core layer 120. In some embodiments, a thickness of the core layer 120 is around 0.05-0.5 μm, and more specifically, 0.08-0.25 μm. In some embodiments, a material of the grating coupler 130 is the same as a material of the core layer 120. In some embodiments, a material of the grating coupler 130 is different from a material of the core layer 120.

Figure 1B:
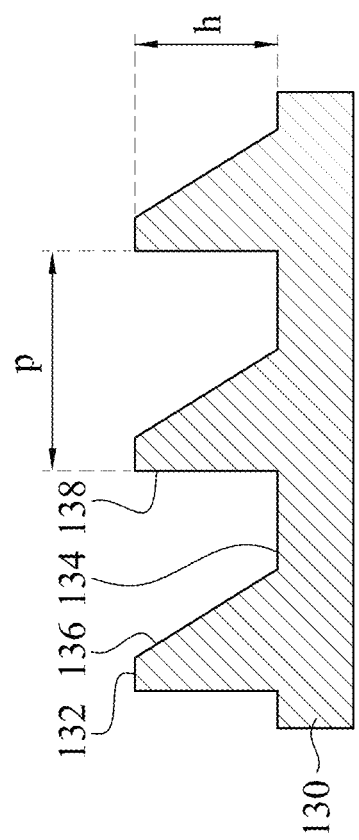
FIG. 1B is an enlargement view of a grating coupler in FIG. 1A.

Please refer to FIG. 1B. FIG. 1B illustrates an enlargement view of the grating coupler 130 in FIG. 1A. The grating coupler 130 has multiple convex parts and multiple recesses. The convex part of the grating coupler 130 has a height h from a top surface 132 of the convex part to a bottom surface 134 of the recess. The grating coupler 130 has a grating period p between two adjacent convex parts. The grating coupler 130 has a continuous surface including the top surface 132, a sidewall 136, a bottom surface 134, and a sidewall 138, and the continuous surface faces away from the substrate 110 of the optical structure 100. In some embodiments, the grating coupler 130 includes a step grating structure, a blazed grating structure, or a slanted grating structure. It should be understood that the grating coupler 130 shown in FIG. 1B is merely a schematic diagram, and the detailed structure of the grating coupler 130 will be described in FIG. 22A to FIG. 22F below.

Please refer to FIG. 1A again. The optical structure 100 includes an upper cladding layer 140, a microlens 150, a laser light 160, and a metal shielding 170. The upper cladding layer 140 covers the core layer 120. Specifically, the upper cladding layer 140 extends and covers a surface of the core layer 120 and a surface of the grating coupler 130. In some embodiments, the upper cladding layer 140 includes silicon dioxide or polymer, and the refractive index of the core layer 120 is greater than a refractive index of the upper cladding layer 140. In some embodiments, the refractive index of the upper cladding layer 140 is less than 1.6, such as 1.1, 1.2, 1.3, 1.4, or 1.5. In some embodiments, a dielectric constant of the upper cladding layer 140 less than 0.00001 at visible light wavelength, such as 0.000008, 0.000005, or 0.000003. The microlens 150 is above the upper cladding layer 140, and the microlens 150 is configured to change incident angles of a single or multiple wavelengths of the laser light 160 entering the grating coupler 130. In FIG. 1A, three arrows pointing to the microlens 150 indicate travel direction of the laser light 160. Specifically, the travel direction of the laser light 160 is changed when the laser light 160 enters into the microlens 150. In some embodiments, a diameter D of the microlens 150 is in a range from 0.05 to 50 mm, such as 0.2, 0.5, 1, 5, 10, 15, 20, 25, 30, 35, 40, or 45 mm. In some embodiments, a refractive index of the microlens 150 is the same as or similar to the refractive index of the upper cladding layer 140. The laser light 160 is an external light. In some embodiments, a laser beam of the laser light 160 has a diameter in a range from 0.1 mm to 10 mm, such as 0.2, 0.5, 1, 2, 4, 6, or 8 mm. The metal shielding 170 covers the microlens 150. The metal shielding 170 has an opening 172 configured to make a portion of the laser light 160 enter the microlens 150. The opening 172 of the metal shielding 170 allows the laser light 160 entering an effective coupling region $R_{eff}$ of the grating coupler 130. In other words, an effective beam EB would enter the microlens 150. A diameter of the effective beam EB is less than the diameter of the laser beam of the laser light 160.

Figure 2:
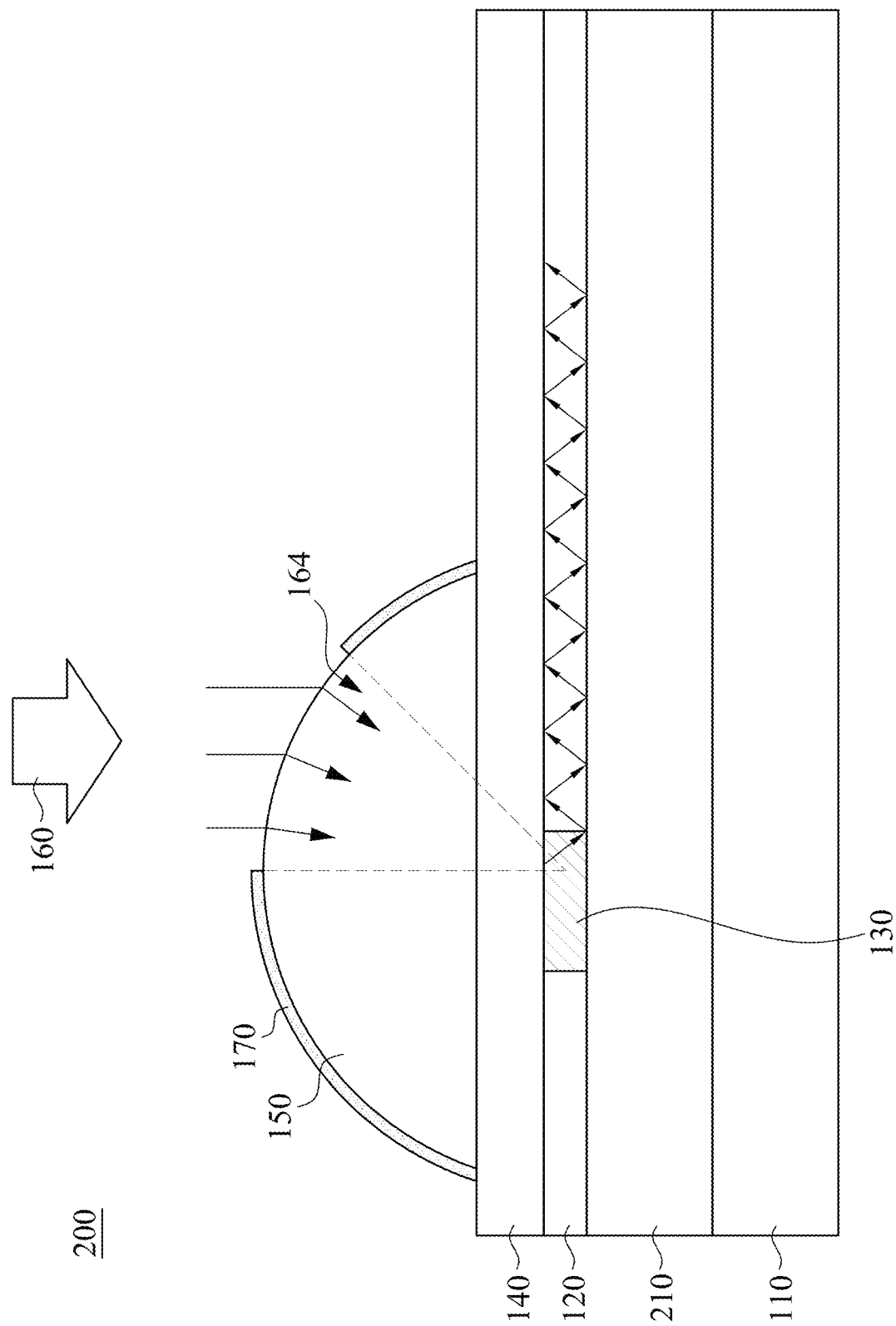

FIG. 2 is a cross-sectional view of an optical structure 200 in accordance with some embodiments of the present disclosure. The optical structure 200 in FIG. 2 further includes a bottom cladding layer 210 compared to the optical structure 100 in FIG. 1A. The bottom cladding layer 210 is between the substrate 110 and the core layer 120. In some embodiments, the bottom cladding layer 210 includes silicon dioxide or polymer, and the refractive index of the core layer 120 is greater than a refractive index of the bottom cladding layer 210. In some embodiments, the refractive index of the bottom cladding layer 210 is less than 1.6, such as 1.1, 1.2, 1.3, 1.4, or 1.5. In some embodiments, the bottom cladding layer 210 has a dielectric constant less than 0.00001 at visible light wavelength, such as 0.000008, 0.000005, or 0.000003. In some embodiments, a refractive index of the microlens 150 is the same as or similar to the refractive index of the bottom cladding layer 210. In some embodiments, substrate 110 is opaque and includes a silicon wafer or a CMOS (complementary metal oxide semiconductor). In some embodiments, the substrate 110 is transparent, and the substrate 110 has a refractive index in a range from 1.45 to 2.0, such as 1.5 or 1.6, 1.7, 1.8, or 1.9. When the substrate 110 is opaque or transparent with a refractive index larger than 1.7, the bottom cladding layer 210 would be disposed between the substrate 110 and the core layer 120.

Please refer to FIG. 1A again. Two dotted lines illustrating from the microlens 150 to the grating coupler 130 form a light area 164. The light area 164 is an area allowing the laser light 160 to couple into the grating coupler 130. A length of each of the dotted line has a lens focal length F, and the two dotted lines form an angle θ and a focal point P. In some embodiments, the angle θ is in a range from 0 degree to 50 degrees, such as 5, 10, 20, 30, or 40 degrees. The focal point P of the optical structure 100 in FIG. 1A is in the grating coupler 130. After the laser light 160 is coupled into the grating coupler 130 through the microlens 150 and the upper cladding layer 140, the laser light 160 would transmit in the core layer 120, thereby making fluorescence-labeled biomolecules above the core layer 120 luminous. The grating coupler 130 has the effective coupling region $R_{eff}$ less than around 20 μm. The effective coupling region $R_{eff}$ is a region where the laser light 160 can couple and transmit in the core layer 120. In other words, if the light area 164 is focused and exposed on the effective coupling region $R_{eff}$ and the incident angles are in the effective coupling angle of the grating coupler 130, the laser light 160 would couple and transmit in the core layer 120. However, if the light area 164 is out of the effective coupling region $R_{eff}$ or out of the range of effective coupling angles of the grating coupler 130, the laser light 160 would not couple and transmit in the core layer 120.

Figure 3:
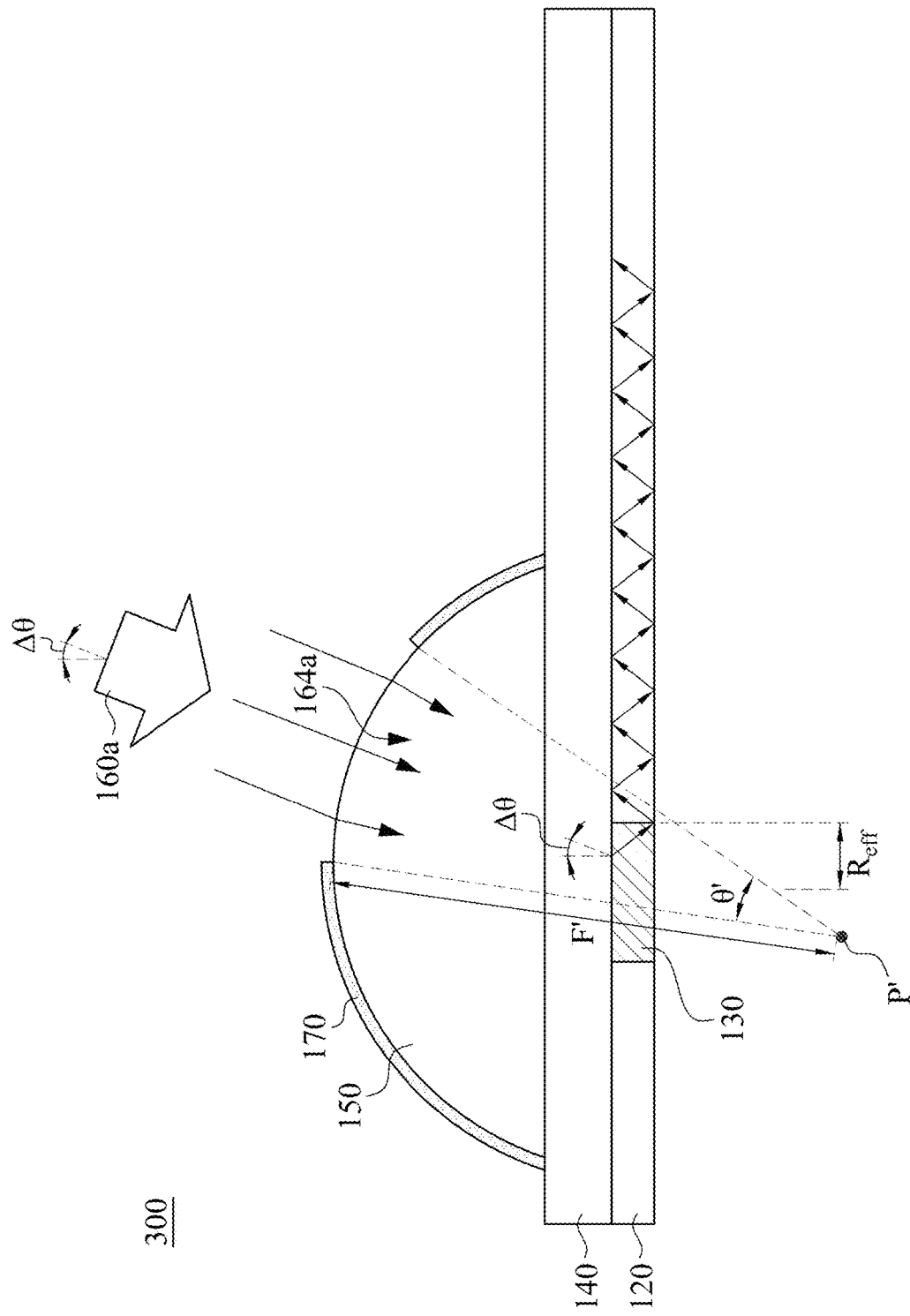

Please refer to FIG. 3. FIG. 3 is a cross-sectional view of an optical structure 300 in accordance with some embodiments of the present disclosure. The grating coupler 130 is adjacent to the core layer 120 and is configured to receive a laser light 160a having offset angles due to the misalignment of an optical system. An irradiation area of the laser light 160a is greater than the effective coupling region $R_{eff}$ of the grating coupler 130. Compared to the optical structure 100 in FIG. 1A, an incident angle of the laser light 160a of the optical structure 300 in FIG. 3 offsets the offset angle Δθ, so that a new light area 164a is formed. The light area 164a forms a new lens focal length F', a new focal point P', and a new angle θ'. The focal point P' of the optical structure 300 in FIG. 3 is out of the grating coupler 130. The light area 164a exposed on the surface of the grating coupler 130 in FIG. 3 is greater than the light area 164 exposed on the surface of the grating coupler 130 in FIG. 1A. The lens focal length F' in FIG. 3 is greater than the lens focal length F in FIG. 1A. The angle θ' in FIG. 3 is less than the angle θ in FIG. 1A. In some embodiments, the offset angle Δθ is ±2 degrees, ±5 degrees, ±10 degrees, or ±20 degrees. The microlens 150 is above the upper cladding layer 140, in which when the laser light 160a enters the microlens 150, the microlens 150 is configured to focus the laser light 160a in the effective coupling region $R_{eff}$ of the grating coupler 130. Despite the fact that the laser light 160a is offset, the light area 164a covers the effective coupling region $R_{eff}$ of the grating coupler 130, and the new angle θ' is smaller than the angle θ which means the new incident angles due to the offset Δθ of the laser beam 160a are smaller than the designed effective coupling angles of the grating coupler 130. Therefore, the laser light 160a can still couple and transmit in the core layer 120. The optical structure of the present disclosure can provide a large alignment tolerance in the optical structure, thereby increasing the overall coupling efficiency of the optical structure for bio-detections. It is noticed that the following optical structures are illustrated for clarity of discussion, but the offset of the laser light 160 should also include therein.

It should be understood that FIG. 3 may include the substrate 110 in FIG. 1A, and may further include the bottom cladding layer 210 in FIG. 2. Similarly, FIG. 4 to FIG. 7 and FIG. 12 to FIG. 15 below may include the substrate 110 in FIG. 1A, and may further include the bottom cladding layer 210 in FIG. 2.

FIG. 4, FIG. 5, FIG. 6, and FIG. 7 are cross-sectional views of optical structures 100a, 100b, 100c, and 100d in accordance with alternative embodiments of the present disclosure.

Please refer to FIG. 1A, FIG. 4, and FIG. 5 at the same time. The differences between the optical structures 100a, 100b and the optical structures 100 are sizes of the openings 172. As shown in FIG. 4, an opening 172a of the metal shielding 170a of the optical structures 100a is greater than the opening 172 of the metal shielding 170 of the optical structures 100. A greater effective beam EBa of the optical structures 100a is greater than the greater effective beam EB of the optical structures 100. A light area 164a of the optical structures 100a is greater than the light area 164 of the optical structures 100, and an angle in the light area 164a is in a range from −θ to θ. The laser light 160 (see Fig, 1A) would couple and transmit in the core layer 120 because the light area 164a is focused and exposed on the effective coupling region $R_{eff}$ and the incident angles are in the effective coupling angles of the grating coupler 130. Therefore, the grating coupling efficiency would be increased. As shown in FIG. 5, an opening 172b of the metal shielding 170b of the optical structures 100b is on the left side of the microlens 150. A light area 164b of the optical structures 100b forms an angle -8. The laser light 160 would couple and transmit in the core layer 120 because the light area 164b is focused and exposed on the effective coupling region $R_{eff}$ and the incident angles are in the effective coupling angles of the grating coupler 130. In some embodiments, the angle θ is in a range from 0 to 50 degrees depending on the effective coupling angles of the grating couplers.

Please refer to FIG. 1A and FIG. 6. The difference between the optical structure 100c and the optical structure 100 is the positions of the metal shielding 170. As shown in FIG. 6, the metal shielding 170c is below the microlens 150. In other words, the metal shielding 170c is disposed between the microlens 150 and the grating coupler 130. Specifically, the metal shielding 170c is between the microlens 150 and the upper cladding layer 140. The metal shielding 170c has an opening 172c to make a portion of the laser light 160 enter the grating coupler 130. The laser light 160 would couple and transmit in the core layer 120 because the light area 164c is focused and exposed on the effective coupling region $R_{eff}$ and the incident angles are in the effective coupling angles of the grating coupler 130.

Please refer to FIG. 1A and FIG. 7. The difference between the optical structure 100d and the optical structure 100 is the arrangement of the upper cladding layer 140 and an air gap 710. The upper cladding layer 140 in the optical structures 100 is replaced by the air gap 710, as shown in FIG. 7. In some embodiments, a thickness of the air gap 710 is in a range from 10 μm to 10 mm, such as 0.05 mm, 0.1 mm, 0.5 mm, 1 mm, or 5 mm.

FIG. 8, FIG. 9A, FIG. 10A, and FIG. 11A are cross-sectional views of optical structures 800, 800a, 800b, 800c in accordance with alternative embodiments of the present disclosure. It is noticed that the main differences between FIG. 1A, FIG. 8, FIG. 9A, FIG. 10A, and FIG. 11A are the positions of the grating coupler 130. As shown in FIG. 1A, the grating coupler 130 is embedded in the core layer 120.

Figure 8:
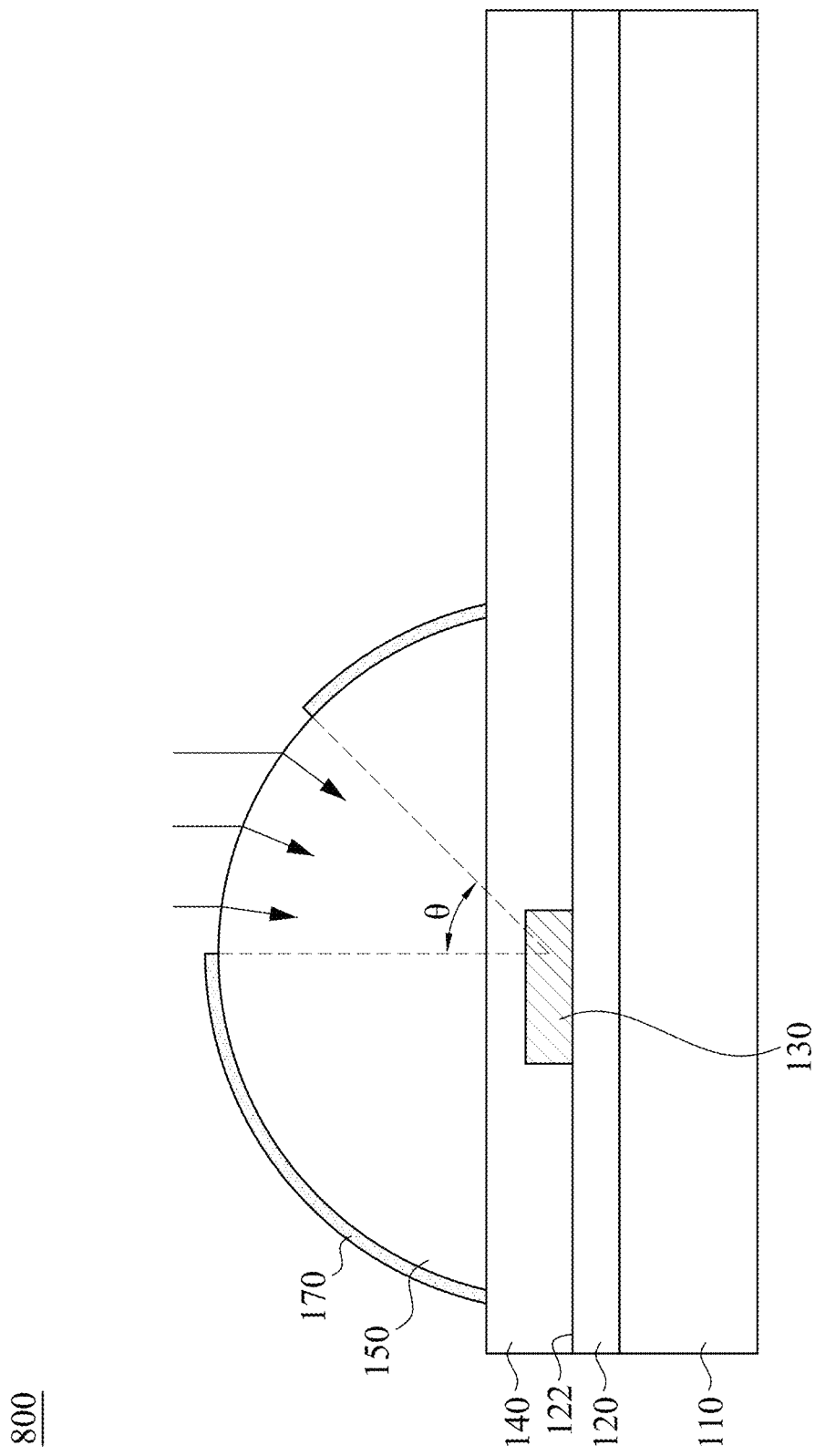

Please refer to FIG. 8. In the optical structure 800, the grating coupler 130 is on a surface 122 of the core layer 120 facing toward the microlens 150, and the core layer 120 has a portion between the grating coupler 130 and the substrate 110. Specifically, the grating coupler 130 is lower than the microlens 150 and higher than the core layer 120, and the grating coupler 130 is embedded in the upper cladding layer 140. In some embodiments, a material of the grating coupler 130 is the same as a material of the core layer 120. In some embodiments, a material of the grating coupler 130 is different from a material of the core layer 120. An enlargement view of the grating coupler 130 in FIG. 8 may refer to FIG. 1B.

Figure 9A:
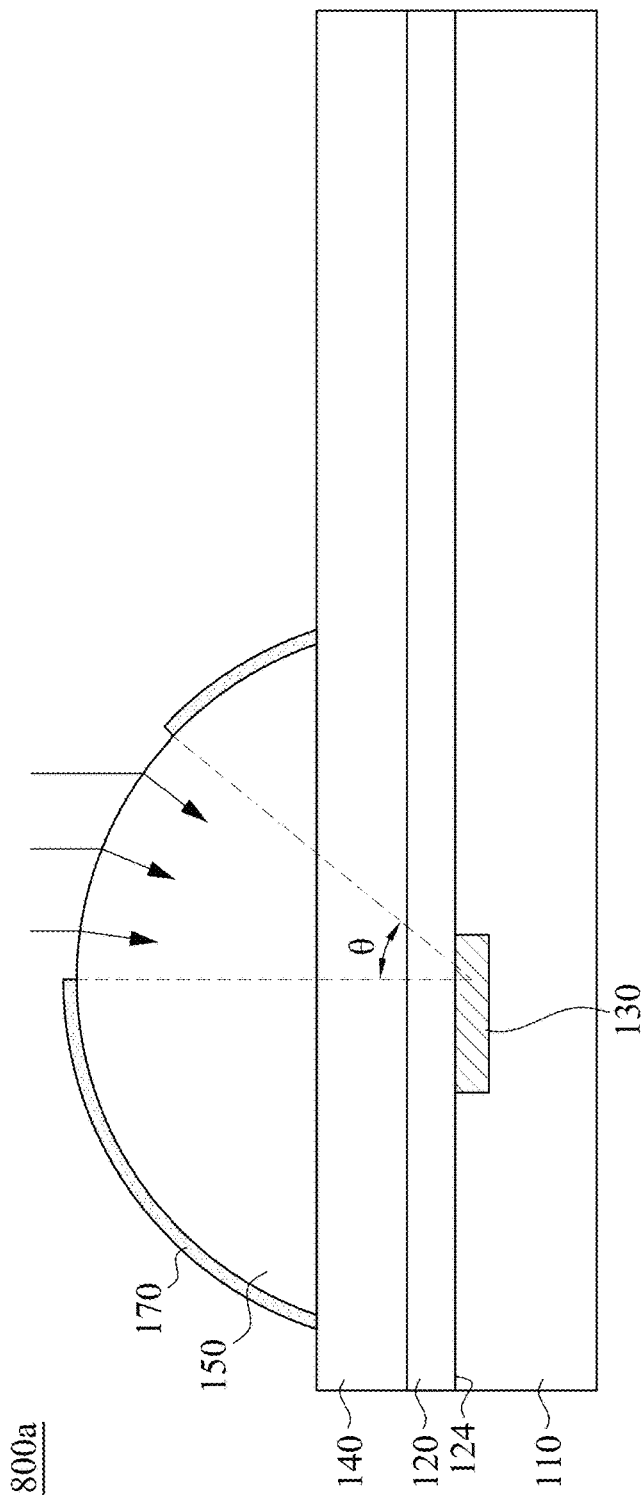
Figure 9B:
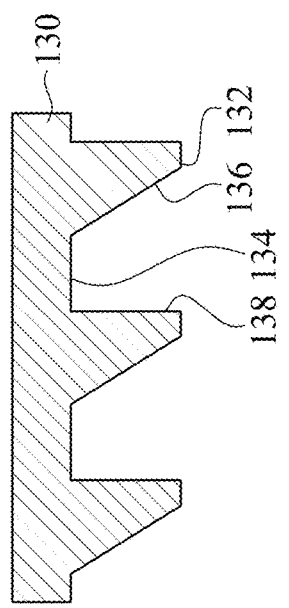

Please refer to FIG. 9A. In the optical structure 800a, the grating coupler 130 is disposed on a surface 124 of the core layer 120 facing toward the substrate 110, and the core layer 120 has a portion between the microlens 150 and the grating coupler 130. Specifically, the grating coupler 130 is embedded in the substrate 110. Please refer to FIG. 9B, and FIG. 9B illustrates an enlargement view of the grating coupler 130 in FIG. 9A. The continuous surface (the top surface 132, the sidewall 136, the bottom surface 134, and the sidewall 138) of the grating coupler 130 faces toward the substrate 110.

Figure 10A:
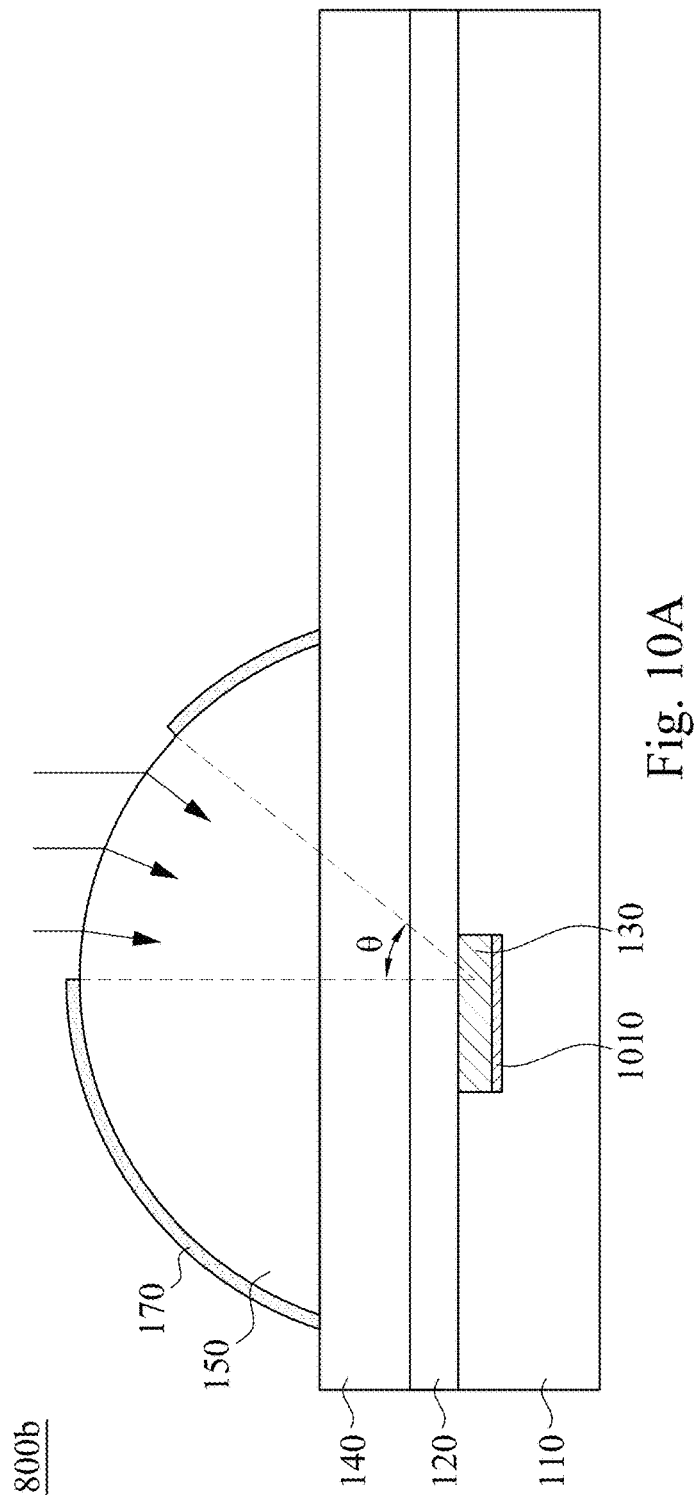
Figure 10B:
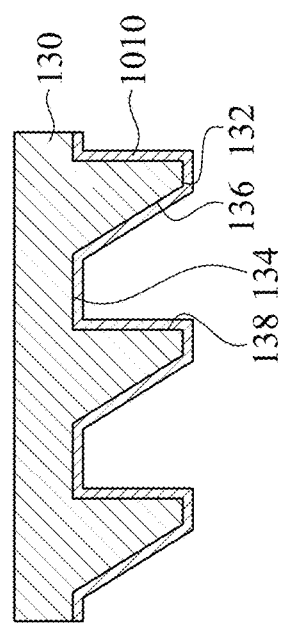
Figure 12:
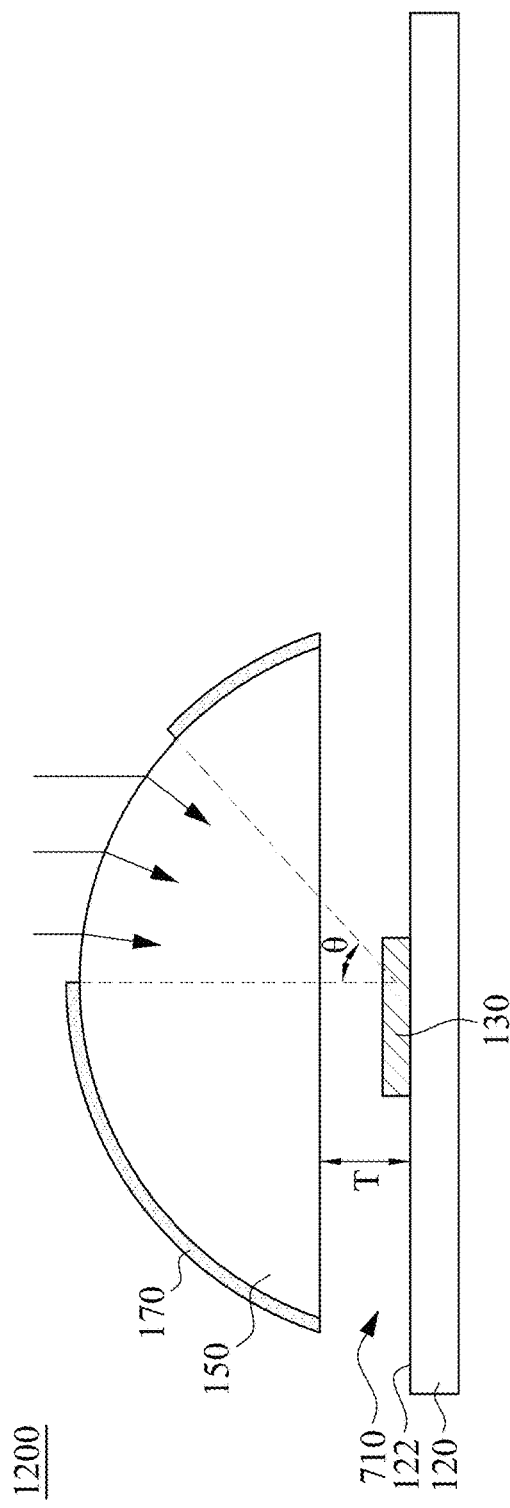
Figure 13:
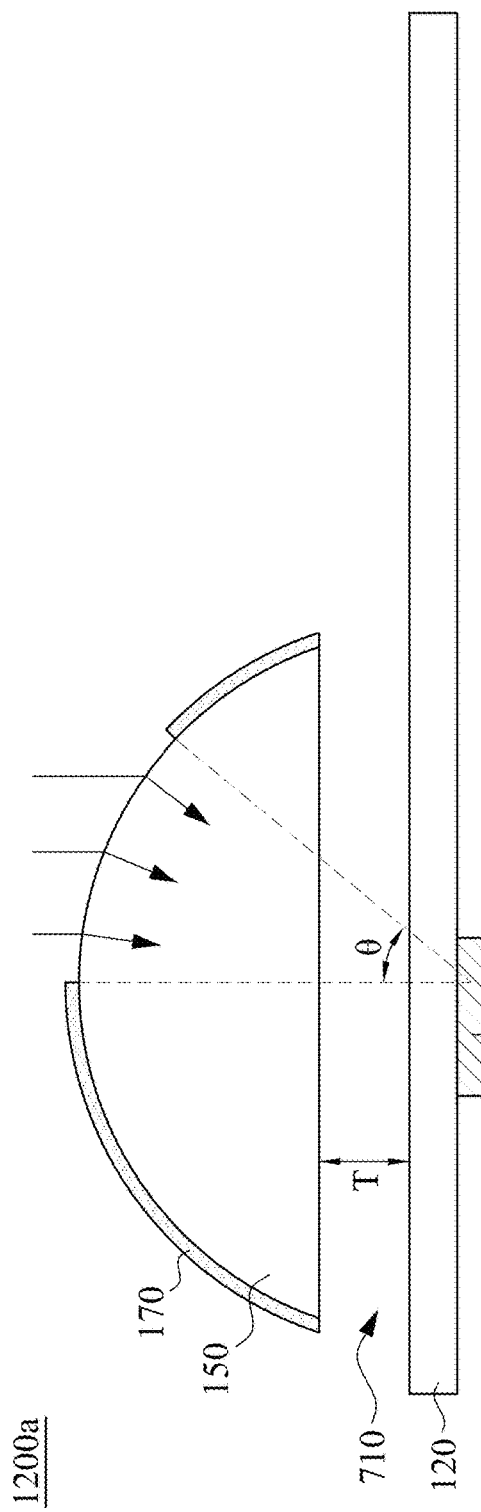

Please refer to FIG. 10A. The optical structure 800b further includes a metal reflector 1010 comparing to the optical structure 800a. Please refer to FIG. 10B, and FIG. 10B illustrates an enlargement view of the grating coupler 130 in FIG. 10A. The metal reflector 1010 is disposed on a surface (the top surface 132, the sidewall 136, the bottom surface 134, and the sidewall 138) of the grating coupler 130 facing toward the substrate 110.

Please refer to FIG. 11A. The optical structure 800c further includes a metal reflector 1010 compared to the optical structure 100. Specifically, the grating coupler 130 and the metal reflector 1010 are embedded in the core layer 120. Please refer to FIG. 11B, and FIG. 11B illustrates an enlargement view of the grating coupler 130 in FIG. 11A. The grating coupler 130 has a surface (the top surface 132, the sidewall 136, the bottom surface 134, and the sidewall 138) facing toward the substrate 110 and a sidewall 139 adjoining the surface. The metal reflector 1010 is disposed on the surface (the top surface 132, the sidewall 136, the bottom surface 134, and the sidewall 138) and the sidewall 139 of the grating coupler 130.

FIG. 12, FIG. 13, FIG. 14, and FIG. 15 are cross-sectional views of optical structures 1200, 1200a, 1200b, 1200c in accordance with alternative embodiments of the present disclosure. It is noticed that the main differences between FIG. 8, FIG. 9A, FIG. 10A, FIG. 11A and FIG. 12, FIG. 13, FIG. 14, FIG. 15 are the arrangements of the upper cladding layer 140 and the air gap 710. Specifically, the upper cladding layers 140 in FIG. 8, FIG. 9A, FIG. 10A, and FIG. 11A are replaced by the air gaps 710 in FIG. 12, FIG. 13, FIG. 14, and FIG. 15. Reference numerals are repeated herein to show the same or similar features, and the description above applies equally to the embodiments described below, and the details thereof are not repeatedly described.

Figure 16:
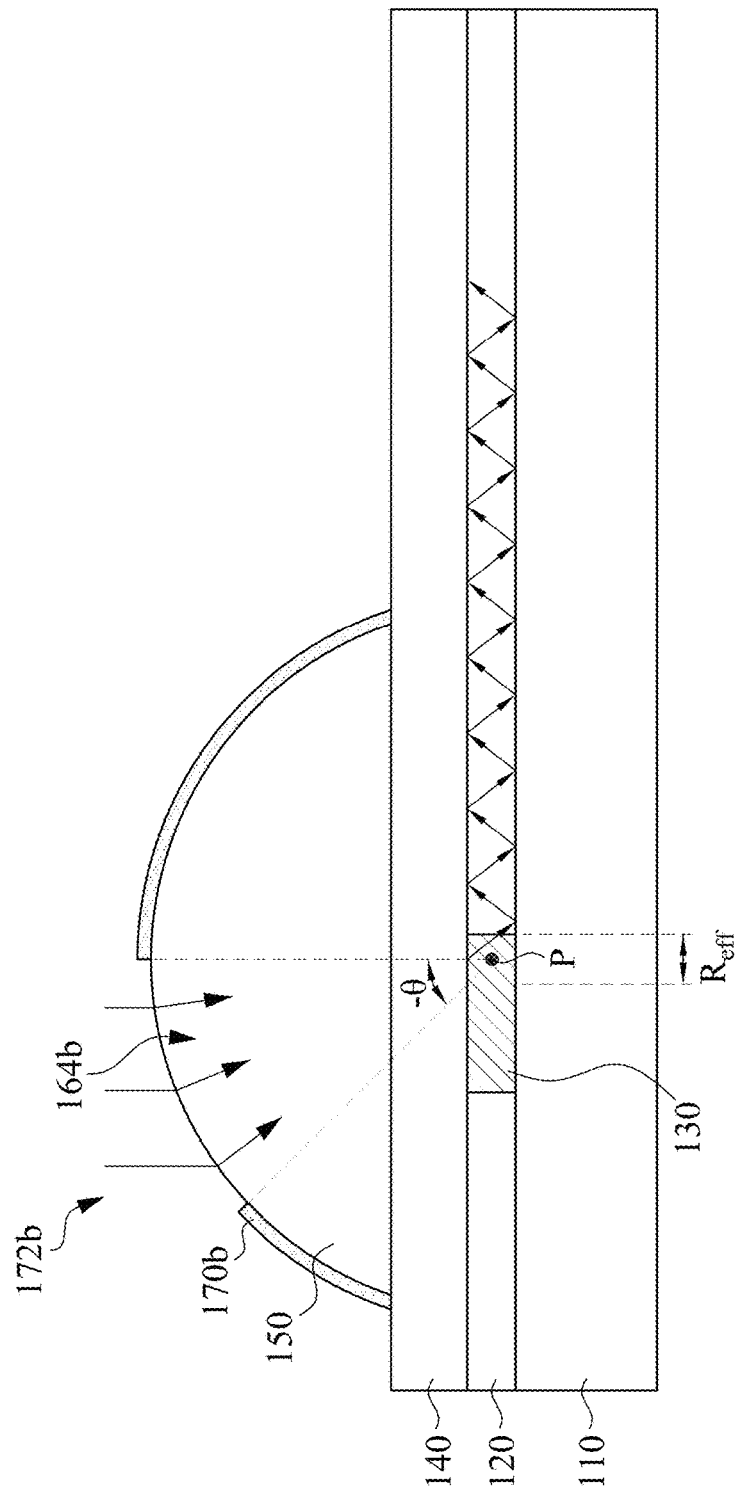
FIG. 16 is a cross-sectional view of an optical structure in accordance with alternative embodiments of the present disclosure.

Please refer to FIG. 16. FIG. 16 is a cross-sectional view of an optical structure 1600 in accordance with alternative embodiments of the present disclosure. Specifically, the optical structure 1600 in FIG. 16 is similar to the optical structure 100b in FIG. 5, but the optical structure 1600 further includes the substrate 110 below the core layer 120 and the grating coupler 130.

Figure 17B:
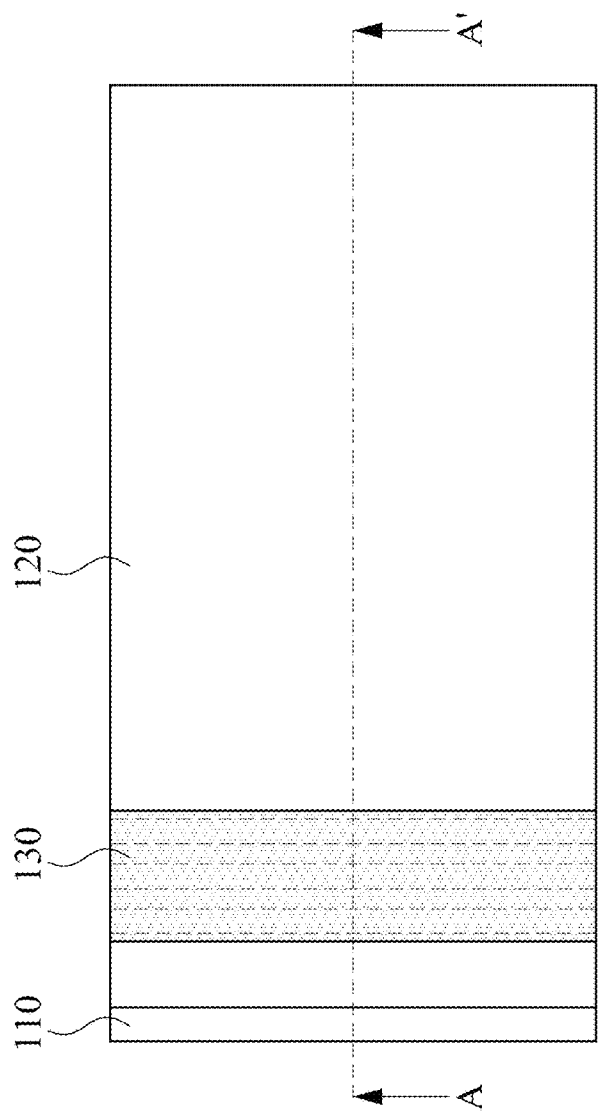
FIG. 17B is a top view of a substrate, a core layer, and a grating coupler, of the optical structure in FIG. 16.
Figure 17A:
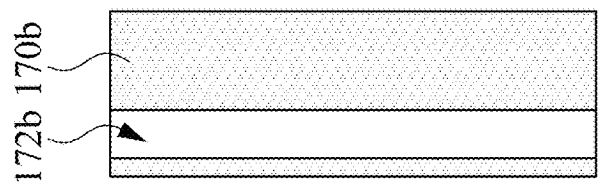
FIG. 17A is a top view of a metal shielding of the optical structure in FIG. 16.
Figure 17C:
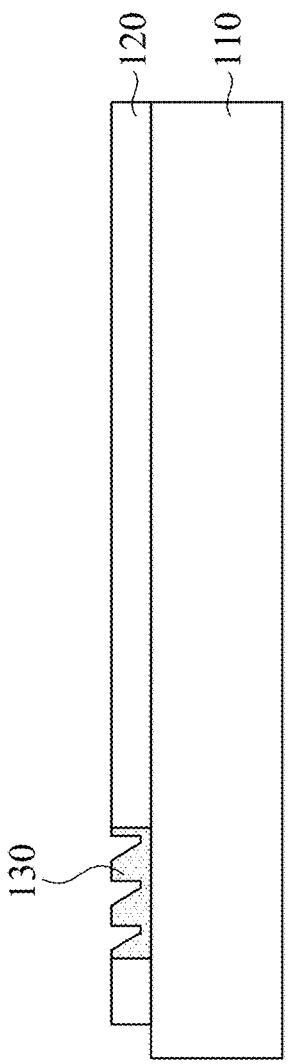
FIG. 17C is a cross-sectional view of the substrate, the core layer, and the grating coupler taken along line A-A' in FIG. 17B.

FIG. 17A is a top view of the metal shielding 170b of the optical structure 1600 in FIG. 16. FIG. 17B is a top view of the substrate 110, the core layer 120, and the grating coupler 130 of the optical structure 1600 in FIG. 16. FIG. 17C is a cross-sectional view of the substrate 110, the core layer 120, and the grating coupler 130 taken along line A-A' in FIG. 17B. As shown in FIG. 17A, the metal shielding 170b includes a straight shape. As shown in FIG. 16, a cross-sectional shape of the microlens 150 is half-cylindrical. As shown in FIG. 17B, the core layer 120 includes a planar waveguide.

Figure 18A:
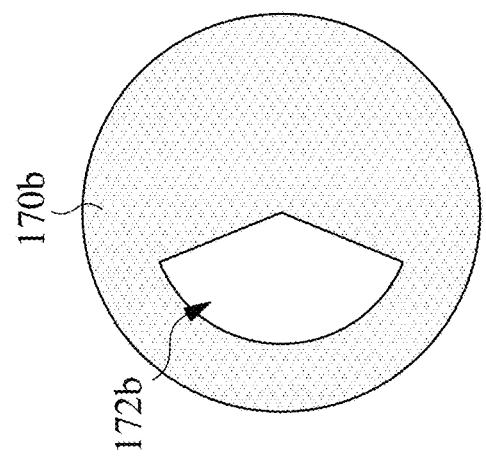
FIG. 18A is a top view of a metal shielding of the optical structure in FIG. 16.
Figure 18B:
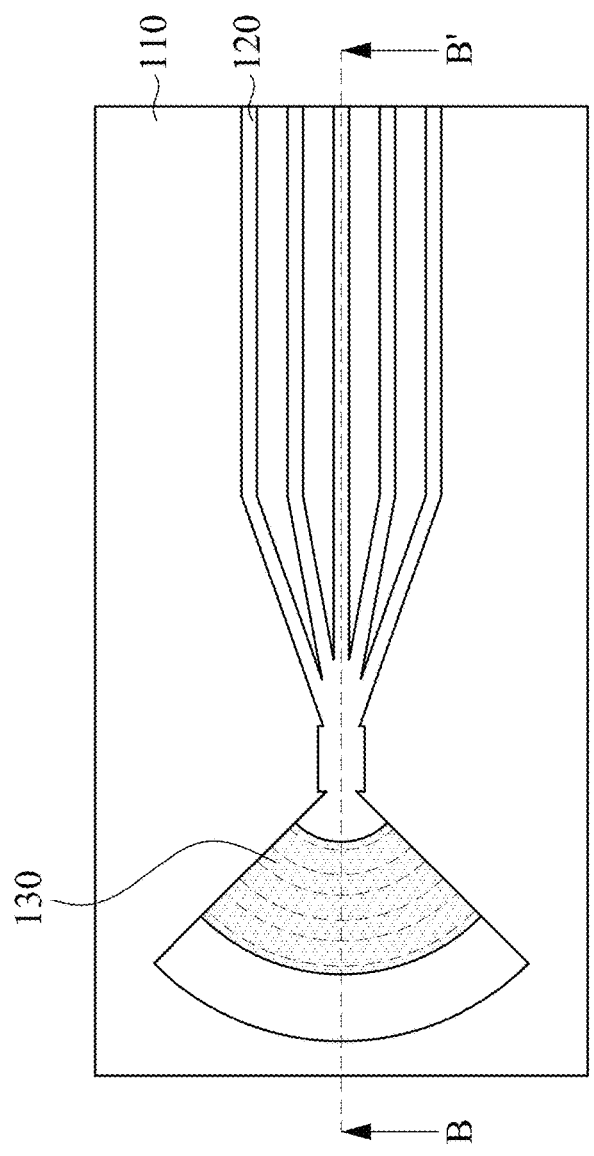
FIG. 18B is a top view of a substrate, a core layer, and a grating coupler, of the optical structure in FIG. 16.
Figure 18C:
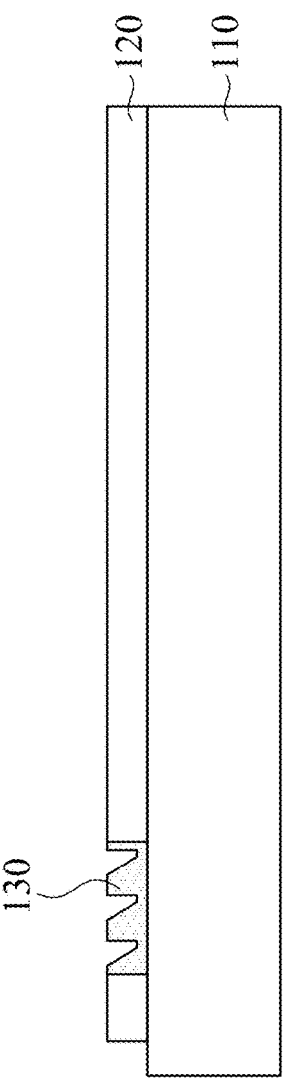
FIG. 18C is a cross-sectional view of the substrate, the core layer, and the grating coupler taken along line B-B' in FIG. 18B.

FIG. 18A is a top view of the metal shielding 170b of the optical structure 1600 in FIG. 16. FIG. 18B is a top view of the substrate 110, the core layer 120, and the grating coupler 130 of the optical structure 1600 in FIG. 16. FIG. 18C is a cross-sectional view of the substrate 110, the core layer 120, and the grating coupler 130 taken along line B-B' in FIG. 18B. As shown in FIG. 18A, the grating coupler 130 includes a curved shape. As shown in FIG. 18B, the core layer 120 includes a plurality of channel waveguides.

Figure 19:
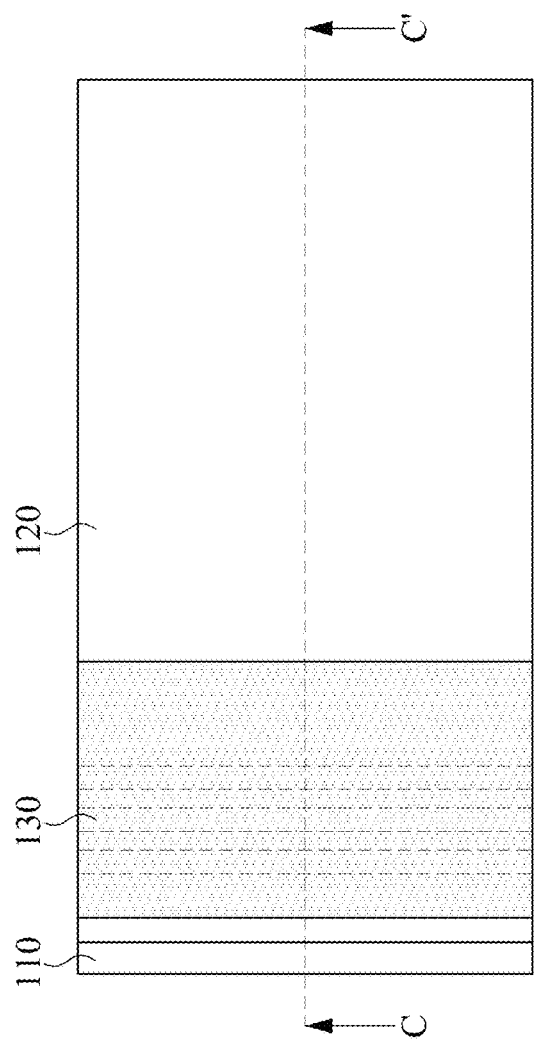
FIG. 19 and FIG. 20 are top views of a substrate, a core layer, and a grating coupler of the optical structure in FIG. 16.
Figure 20:
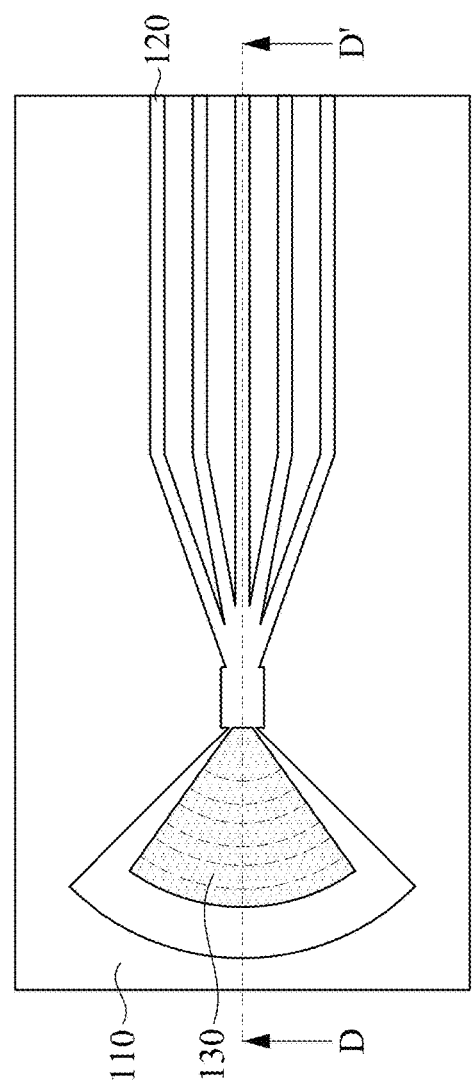

FIG. 19 and FIG. 20 are top views of the substrate 110, the core layer 120, and the grating coupler 130 of the optical structure 1600 in FIG. 16. FIG. 21A, FIG. 21B, FIG. 21C, and FIG. 21D are cross-sectional views of FIG. 19 taken along line C-C'. Similarly, FIG. 21A, FIG. 21B, FIG. 21C, and FIG. 21D also are cross-sectional views of FIG. 20 taken along line D-D'.

Figure 21A:
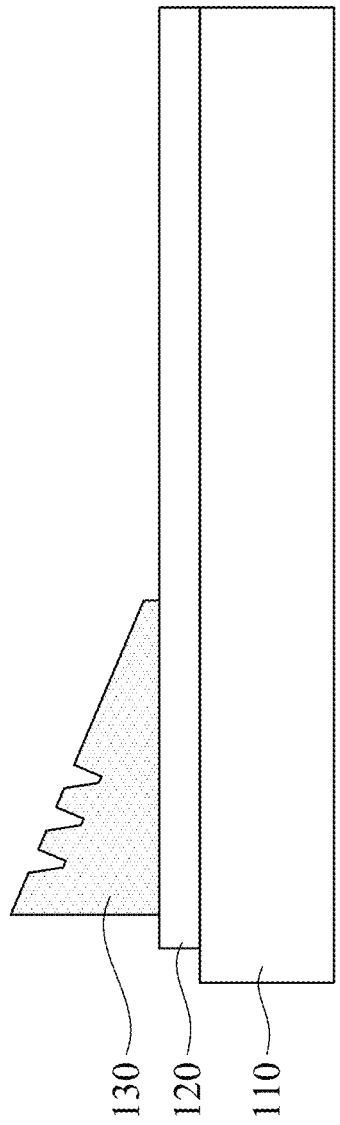
FIG. 21A, FIG. 21B, FIG. 21C, and FIG. 21D are cross-sectional views of FIG. 19 taken along line C-C' and cross-sectional views of FIG. 20 taken along line D-D'.
Figure 21B:
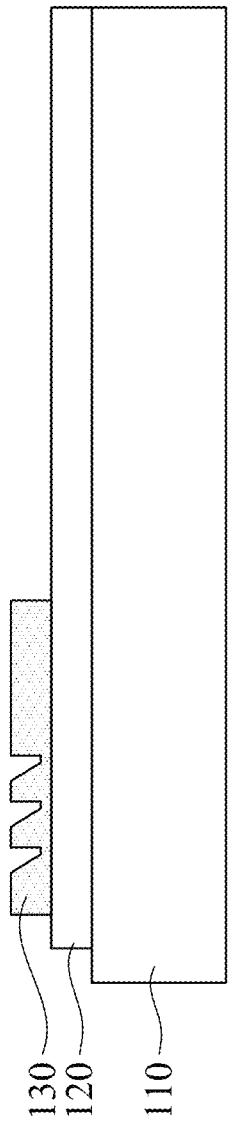
Figure 21C:
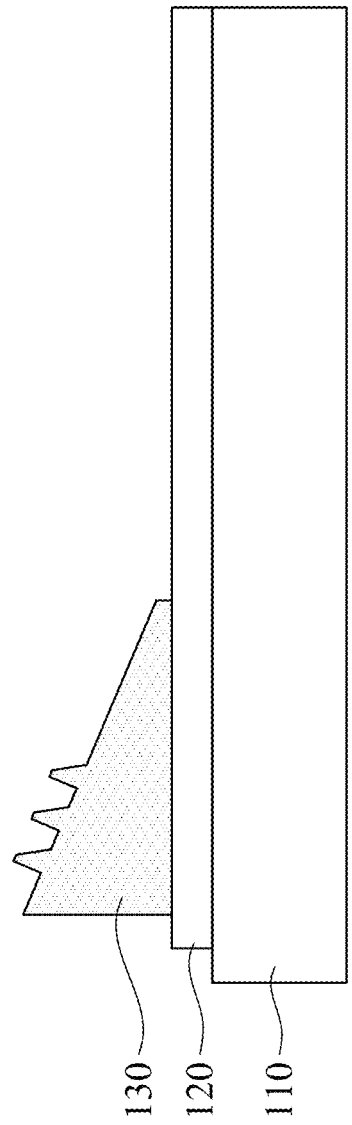
Figure 21D:
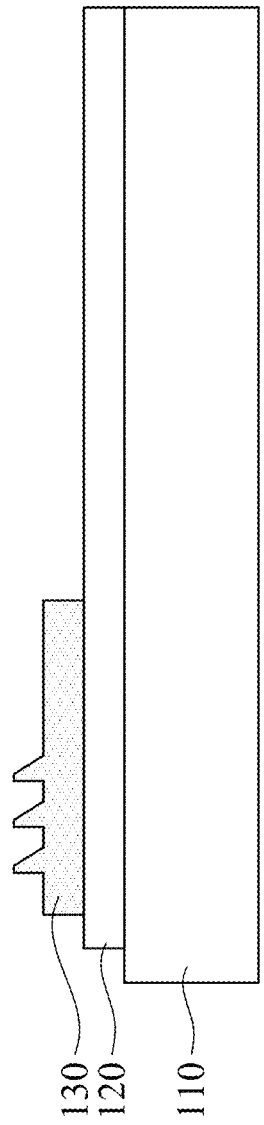

Each of the grating couplers 130 in FIG. 21A and FIG. 21B has multiple recesses. Each of the grating couplers 130 in FIG. 21C and FIG. 21D has multiple convex parts. In some embodiments, a material of the grating coupler 130 is different from a material of the core layer 120. In FIG. 21A, FIG. 21B, FIG. 21C, and FIG. 21D, the laser light 160 would couple into the grating coupler 130 and then transmit in the core layer 120. In some embodiments, the grating coupler 130 has a tapered thickness, as shown in FIG. 21A or FIG. 21C.

Please refer to FIG. 22A to FIG. 22F. FIG. 22A to FIG. 22F are cross-sectional views of various grating structures of the grating coupler 130 (see FIG. 1B) in accordance with some embodiments of the present disclosure. The grating coupler 130 includes at least one of a step grating structure 130a, a blazed grating structure 130b, and slanted grating structures 130c-130f. Please refer to the enlargement view of grating coupler 130 in FIG. 1B again. The grating coupler 120 has the grating period p and the height h. The grating structures 130a-130f in FIG. 22A to FIG. 22F can be selectively used in the grating coupler 120 of FIG. 1B. In addition, the grating structures 130a-130f in FIG. 22A to FIG. 22F can be mirror symmetry structures depending on the transmit directions (such as to the right side or the left side) of the laser light 160 or the laser light 160a. For example, a first vertical sidewall 221 of the step grating structure 130a may face toward to the right side, an oblique sidewall 224 of the blazed grating structure 130b may face toward to the right side, or a first oblique sidewall 225 of the slanted grating structures 130c-130f may face toward to the right side.

Figure 22A:
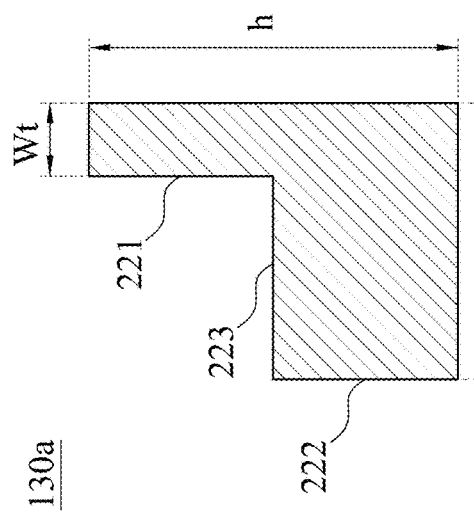
FIG. 22A, FIG. 22B, FIG. 22C, FIG. 22D, FIG. 22E, and FIG. 22F are cross-sectional views of various grating structures of the grating coupler in accordance with some embodiments of the present disclosure.

FIG. 22A illustrates the step grating structure 130a of the grating coupler 130. In some embodiments, the step grating structure 130a has n steps, in which n is in a range from 3 to 16. For example, n is 4, 6, 8, 10, 12, or 14. Specifically, FIG. 22A illustrates a 3-step grating structure. The step grating structure 130a includes the first vertical sidewall 221, a second vertical sidewall 222, and a horizontal surface 223. The horizontal surface 223 adjoins the first vertical sidewall 221 and the second vertical sidewall 222. In some embodiments, a top width Wt of the step grating structure 130a is 80 nm, a bottom width Wb of the step grating structure 130a is 300 nm, the height h of the step grating structure 130a is 400 nm, the first vertical sidewall 221 of the step grating structure 130a has a 200 nm height, the second vertical sidewall 222 of the step grating structure 130a has a 200 nm height, and the horizontal surface 223 of the step grating structure 130a has a 220 nm width.

Figure 22B:
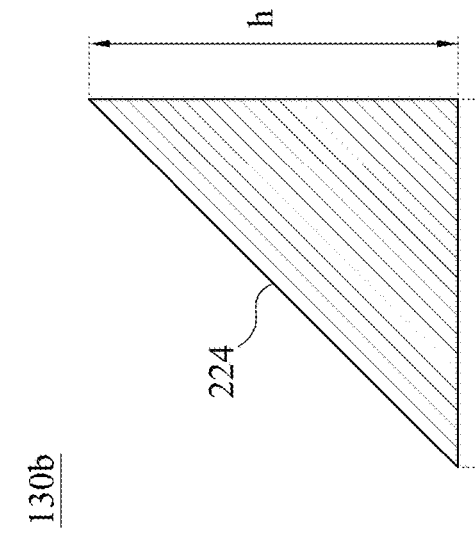

FIG. 22B illustrates the blazed grating structure 130b of the grating coupler 130. The blazed grating structure 130b includes the oblique sidewall 224. The oblique sidewall 224 extends from a top of the blazed grating structure 130b to a bottom of the blazed grating structure 130b, and a width of the blazed grating structure 130b gradually increases from the top of the blazed grating structure to the bottom of the blazed grating structure 130b. In some embodiments, bottom width Wb of the blazed grating structure 130b is 400 nm and the height h of the blazed grating structure 130b is 400 nm.

FIG. 22C to FIG. 22F illustrates the slanted grating structures 130c-130f of the grating coupler 130. Each of the slanted grating structures 130c-130f includes the first oblique sidewall 225, a second oblique sidewall 226, and a top surface 227. The top surface 227 adjoins the first oblique sidewall 225 and the second oblique sidewall 226. Each of the first oblique sidewalls 225 of the slanted grating structures 130c-130f has a first slope and each of the second oblique sidewalls 226 of the slanted grating structures 130c-130f has a second slope. In some embodiments, the first slope is the same as the second slope. In some embodiments, the first slope is less than the second slope.

Figure 22C:
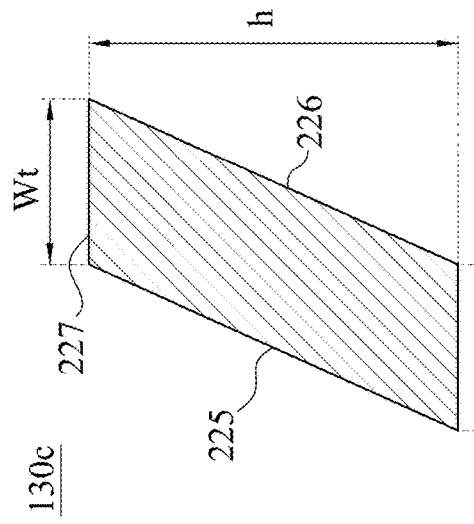
Figure 22D:
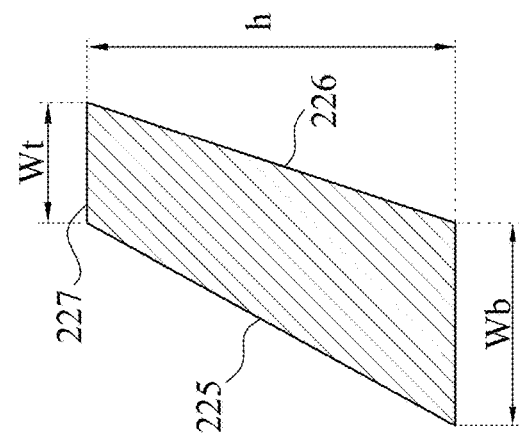
Figure 22E:
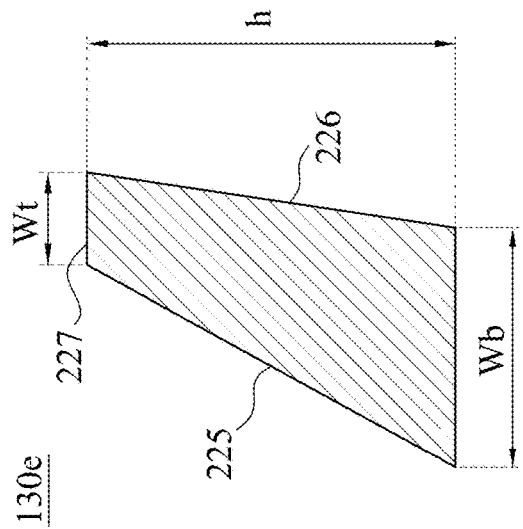
Figure 22F:
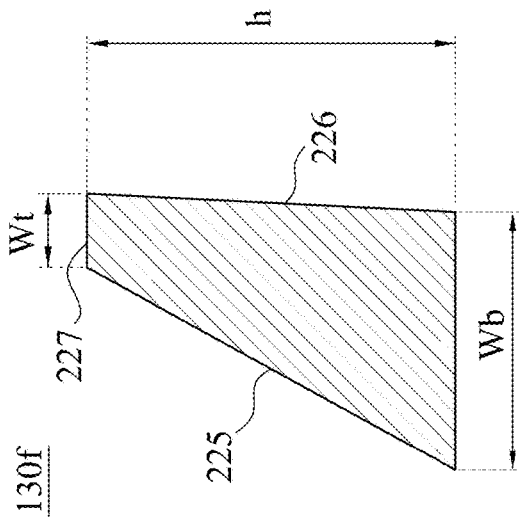

In some embodiments, the bottom width Wb is 180 nm, the top width Wt is 180 nm, and the height h is 400 nm, as shown in FIG. 22C. In some embodiments, the bottom width Wb is 228 nm, the top width Wt is 136 nm, and the height h is 400 nm, as shown in FIG. 22D. In some embodiments, the bottom width Wb is 260 nm, the top width Wt is 100 nm, and the height h is 400 nm, as shown in FIG. 22E. In some embodiments, the bottom width Wb is 280 nm, the top width Wt is 80 nm, and the height h is 400 nm, as shown in FIG. 22F.

FIG. 23A, FIG. 23B, FIG. 24A, FIG. 24B, FIG. 25A, FIG. 25B, FIG. 26A, and FIG. 26B are incident angle-intensity charts for a green light GL having 532 nm wavelength under different grating structures in accordance with some embodiments of the present disclosure. Specifically, the step grating structure 130a, the blazed grating structure 130b, and the slanted grating structure 130c-130f are used in the simulation. More specifically, the grating period p is 400 nm and the height h is 400 nm (please refer to FIG. 1B). The simulation results show the relationships between intensities of different grating couplers 130 and the incident angles of the green light GL under different refractive index of the grating coupler 130 and different refractive index of the upper cladding layer 140. It should be understood that the "intensity" herein represents a coupling efficiency of the grating coupler 130, and the "incident angle" herein represents the angle relative to the normal direction of the surface of the grating coupler 130. In addition, the "full width at half maximum (FWHM)" herein can be understood as an effective coupling angle of the grating coupler. Rigorous Coupled Wave Analysis (RCWA) method is used.

Please refer to FIG. 23A and FIG. 23B. In the simulation results of FIG. 23A and FIG. 23B, the refractive index of the grating coupler 130 is 1.9 and the refractive index of the upper cladding layer 140 is 1. In other words, the upper cladding layer 140 is the air gap 710 (see FIG. 7). In FIG. 23A, the step grating structure 130a, the blazed grating structure 130b, and the slanted grating structure 130c have high intensities when the incident angle is less than around 20 degrees. In FIG. 23B, the slanted grating structure 130c, the slanted grating structure 130d, the slanted grating structure 130e, and the slanted grating structure 130f have high intensities when the incident angle is less than around 40 degrees.

Figure 24A:
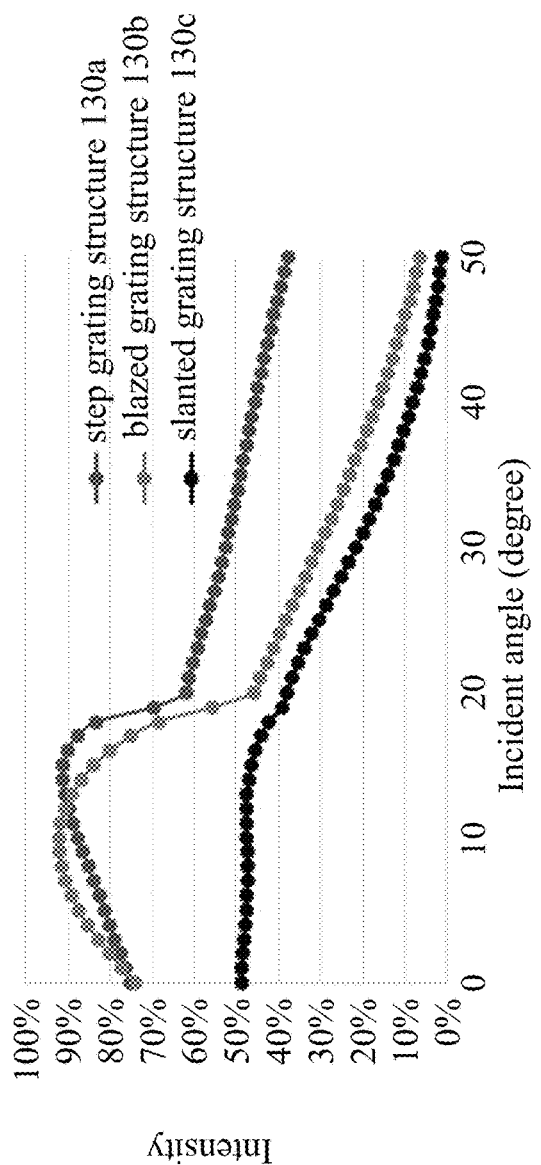
Figure 24B:
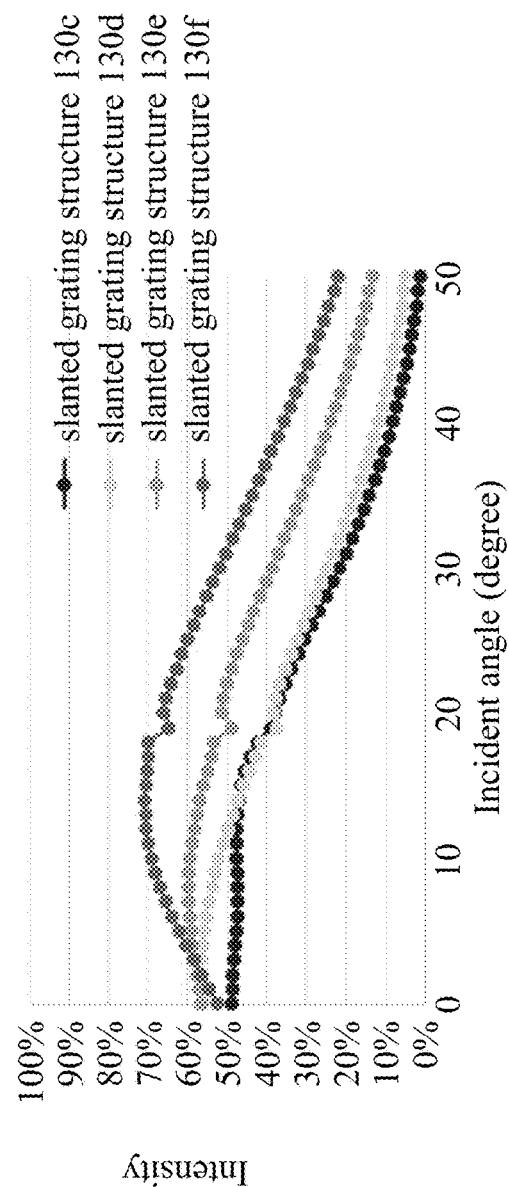

Please refer to FIG. 24A and FIG. 24B. In the simulation results of FIG. 24A and FIG. 24B, the refractive index of the grating coupler 130 is 2.35 and the refractive index of the upper cladding layer 140 is 1. In other words, the upper cladding layer 140 is the air gap 710 (see FIG. 7). In FIG. 24A, the step grating structure 130a and the blazed grating structure 130b have higher intensities than the slanted grating structure 130c. However, the slanted grating structure 130c still has high intensity when the incident angle is less than around 20 degrees. In FIG. 24B, the slanted grating structure 130c, the slanted grating structure 130d, the slanted grating structure 130e, and the slanted grating structure 130f have high intensities when the incident angle is less than around 40 degrees. The slanted grating structure 130f has a greater effective coupling angle tolerance than the slanted grating structure 130c.

Please refer to FIG. 25A and FIG. 25B. In the simulation results of FIG. 25A and FIG. 25B, the refractive index of the grating coupler 130 is 1.9 and the refractive index of the upper cladding layer 140 is 1.47. In FIG. 25A, the slanted grating structure 130c has a higher intensity than those of the step grating structure 130a and the blazed grating structure 130b. In FIG. 25B, the slanted grating structure 130c, the slanted grating structure 130d, the slanted grating structure 130e, and the slanted grating structure 130f have similar intensities as the incident angle increases.

Please refer to FIG. 26A and FIG. 26B. In the simulation results of FIG. 26A and FIG. 26B, the refractive index of the grating coupler 130 is 2.35 and the refractive index of the upper cladding layer 140 is 1.47. In FIG. 26A, the slanted grating structure 130c has a higher intensity than those of the step grating structure 130a and the blazed grating structure 130b when the incident angle is less than around 20 degrees. In FIG. 26B, the slanted grating structure 130c, the slanted grating structure 130d, the slanted grating structure 130e, and the slanted grating structure 130f have high intensities when the incident angle is less than around 20 degrees.

Despite the fact that FIG. 23A to FIG. 26B shows the simulation results of the green light GL having 532 nm wavelength, other lights having different wavelengths (for example, 488 nm and 633 nm) can be also simulated. In the simulation results, the step grating structure 130a, the blazed grating structure 130b, the slanted grating structure 130c-130f show good coupling efficiency and have large effective coupling angle tolerance to some extent.

The optical structure of the present disclosure combines a microlens structure for the conversion of a large and collimating laser beam to a condensed focusing light that is exposed on the effective coupling area. The present disclosure provides a variety of grating structures, such as n-step (n>=3), blazed, or slanted grating, having the features of greater effective coupling angles (full width at half maximum (FWHM)) and high grating coupling efficiencies which allows for the possibilities of coupling more energy from a large laser beam and/or coupling multiple wavelengths into one grating waveguide for the excitation of fluorescence-labeled biomolecules. The present disclosure can also provide a large alignment tolerance in the optical structure including xyz-axis and the angle of incidence, thereby increasing the overall coupling efficiency of the optical structure for bio-detections.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. An optical structure, comprising:
 a grating coupler configured to receive a laser light; and a microlens above the grating coupler, wherein a metal shielding directly covers a surface of the microlens and has an opening allowing the laser light to enter an effective coupling region of the grating coupler.

2. The optical structure of claim 1, wherein the opening of the metal shielding is configured to make a portion of the laser light enter the microlens, and the opening has an angle in a range from −50 degrees to 50 degrees.

3. The optical structure of claim 1, wherein the laser light has offset angles, and an irradiation area of the laser light is greater than the effective coupling region of the grating coupler,
wherein the offset angles are in a range from −20 degrees to 20 degrees.

4. The optical structure of claim 1, wherein the metal shielding is disposed between the microlens and the grating coupler.

5. The optical structure of claim 1, further comprising:
a core layer adjacent to the grating coupler;
a substrate covered by the core layer; and
an upper cladding layer covering the core layer.

6. The optical structure of claim 5, wherein the substrate comprises sapphire or glass, and has a refractive index in a range from 1.45 to 2.0.

7. The optical structure of claim 5, further comprising a bottom cladding layer between the substrate and the core layer, wherein the bottom cladding layer has a refractive index less than 1.6 and a dielectric constant less than 0.00001 at visible light wavelength, and the substrate comprises silicon or CMOS.

8. The optical structure of claim 5, wherein the upper cladding layer comprises silicon oxide or polymer, and a refractive index of the core layer is greater than a refractive index of the upper cladding layer,
wherein the refractive index of the upper cladding layer is less than 1.6 and a dielectric constant less than 0.00001 at visible light wavelength.

9. The optical structure of claim 5, wherein the grating coupler is embedded in the core layer.

10. The optical structure of claim 9, wherein the grating coupler comprises a straight shape when viewed from above, a cross-sectional shape of the microlens is half-cylindrical, and the core layer comprises a planar waveguide.

11. The optical structure of claim 9, wherein the grating coupler comprises a curved shape when viewed from above, and the core layer comprises a plurality of channel waveguides.

12. The optical structure of claim 9, wherein the grating coupler has a surface facing toward the substrate and a sidewall adjoining the surface, and the optical structure further comprises a metal reflector disposed on the surface and the sidewall of the grating coupler.

13. The optical structure of claim 5, wherein the grating coupler is disposed on a surface of the core layer facing toward the microlens, and the core layer has a portion between the grating coupler and the substrate, wherein a material of the grating coupler is different from a material of the core layer.

14. The optical structure of claim 13, wherein the grating coupler has a tapered thickness.

15. The optical structure of claim 5, wherein the grating coupler is disposed on a surface of the core layer facing toward the substrate, and the core layer has a portion between the microlens and the grating coupler.

16. The optical structure of claim 15, further comprising a metal reflector disposed on a surface of the grating coupler facing toward the substrate.

17. The optical structure of claim 1, wherein the grating coupler is a step grating structure, a blazed grating structure, or a slanted grating structure.

18. The optical structure of claim 17, wherein the step grating structure comprises a first vertical sidewall, a second vertical sidewall, and a horizontal surface adjoining the first vertical sidewall and the second vertical sidewall.

19. The optical structure of claim 17, wherein the blazed grating structure comprises an oblique sidewall extending from a top of the blazed grating structure to a bottom of the blazed grating structure, and a width of the blazed grating structure gradually increases from the top of the blazed grating structure to the bottom of the blazed grating structure.

20. The optical structure of claim 17, wherein the slanted grating structure comprises a first oblique sidewall, a second oblique sidewall, and a top surface adjoining the first oblique sidewall and the second oblique sidewall.

* * * * *